(12) United States Patent
Bae

(10) Patent No.: US 12,130,422 B2
(45) Date of Patent: Oct. 29, 2024

(54) LASER APPARATUS

(71) Applicant: NPS CO., LTD., Cheongju-si (KR)

(72) Inventor: Seong Ho Bae, Daejeon (KR)

(73) Assignee: NPS CO., LTD., Cheongju-si (KR)

(\*) Notice: Subject to any disclaimer, the term of this patent is extended or adjusted under 35 U.S.C. 154(b) by 959 days.

(21) Appl. No.: 17/066,945

(22) Filed: Oct. 9, 2020

(65) Prior Publication Data

US 2021/0109341 A1    Apr. 15, 2021

(30) Foreign Application Priority Data

Oct. 9, 2019    (KR) .......................... 10-2019-0124959
Dec. 16, 2019   (KR) .......................... 10-2019-0167604

(51) Int. Cl.
*G02B 26/08*    (2006.01)
*B23K 26/04*    (2014.01)
(Continued)

(52) U.S. Cl.
CPC ........ *G02B 26/0816* (2013.01); *B23K 26/043* (2013.01); *B23K 26/1462* (2015.10);
(Continued)

(58) Field of Classification Search
CPC ............ G02B 26/0816; B23K 26/1462; B23K 26/043; B23K 26/38; G06N 20/00; G01M 11/0221; G05B 19/401; G05B 2219/4719
See application file for complete search history.

(56) References Cited

U.S. PATENT DOCUMENTS

2019/0278251 A1\*   9/2019   Zhi .................... G05B 19/4061

FOREIGN PATENT DOCUMENTS

| EP | 2894004 A1 | \* | 7/2015 | ............. B23K 26/03 |
| JP | H08132264 A | \* | 5/1996 | |
| JP | H11179579 A | \* | 7/1999 | ........... B23K 26/043 |

\* cited by examiner

*Primary Examiner* — Janie M Loeppke
*Assistant Examiner* — Theodore J Evangelista
(74) *Attorney, Agent, or Firm* — Bridgeway IP Law Group, PLLC; Jihun Kim

(57) ABSTRACT

The present disclosure relates to a laser apparatus including a laser oscillator for oscillating a laser beam; a mirror mount assembly including a mount-side reflective mirror for transmitting the laser beam by reflecting the laser beam; an aligner including a dial that is configured to change alignment of the mount-side reflective mirror according to a rotation angle and a rotation direction and is responsible for adjusting, by the degree of displacement of the reflection angle of the mount-side reflective mirror according to change in the alignment state, a processing optical path through which the laser beam travels, and a driving motor for driving rotation of the dial; an examination module for calculating the optical path difference between a predetermined reference processing optical path and the processing optical path and examining whether optical path distortion occurs on the processing optical path; a calculation module for, when the optical path difference exceeds predetermined reference optical path difference, calculating the target driving speed and target driving time of the driving motor for changing alignment of the mount-side reflective mirror to correct the optical path distortion so that the optical path difference is less than or equal to the predetermined reference optical path difference; and a controller for driving the driving motor according to the target driving speed and the target driving time, wherein the examination module recalculates the optical path difference between the reference processing optical path and the processing optical path that has been changed by the driving motor according to the target driving speed and the target driving time and reexamines whether the optical path distortion occurs, the (Continued)

calculation module recalculates the target driving speed and the target driving time based on the recalculated optical path difference when the recalculated optical path difference exceeds the reference optical path difference, and the controller drives the driving motor again according to the recalculated target driving speed and target driving time.

11 Claims, 30 Drawing Sheets

(51) Int. Cl.
*B23K 26/14* (2014.01)
*B23K 26/38* (2014.01)
*G01M 11/02* (2006.01)
*G05B 19/401* (2006.01)
*G06N 20/00* (2019.01)

(52) U.S. Cl.
CPC ....... *G01M 11/0221* (2013.01); *G05B 19/401* (2013.01); *G06N 20/00* (2019.01); *B23K 26/38* (2013.01); *G05B 2219/4719* (2013.01)

[FIG. 1]
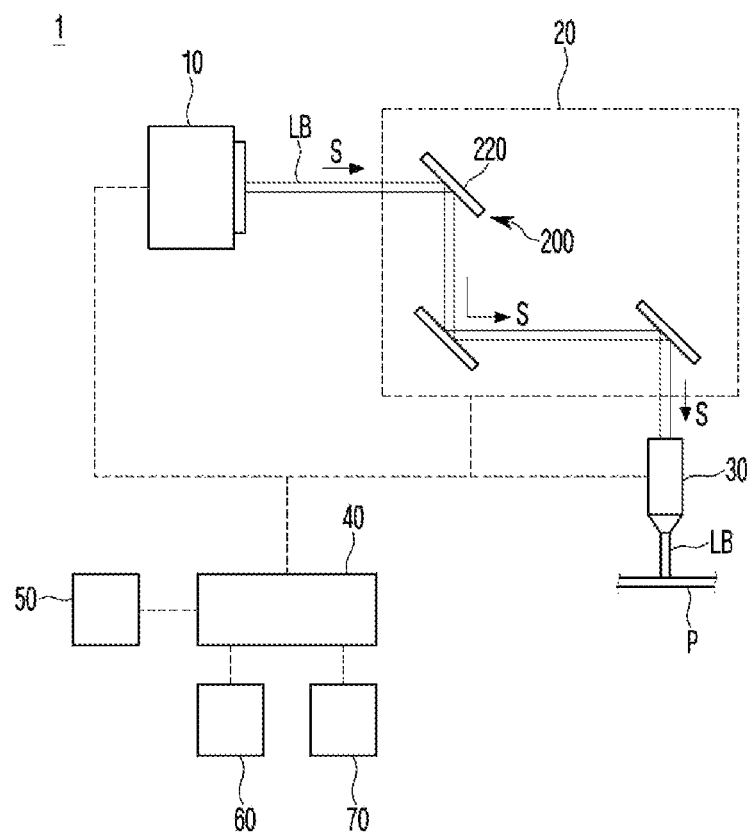

[FIG. 2]
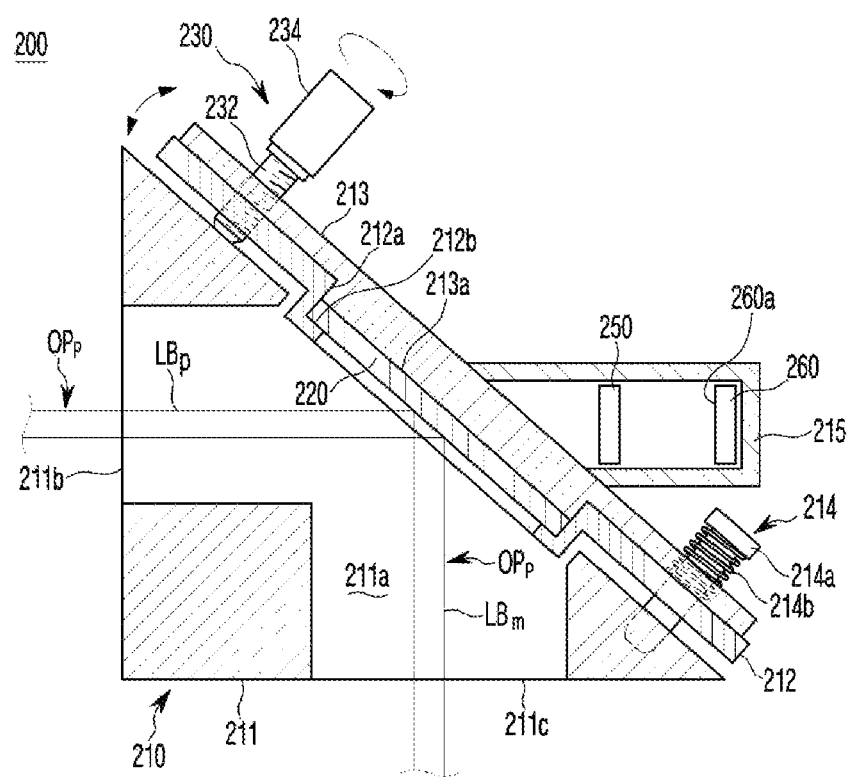

[FIG. 3]
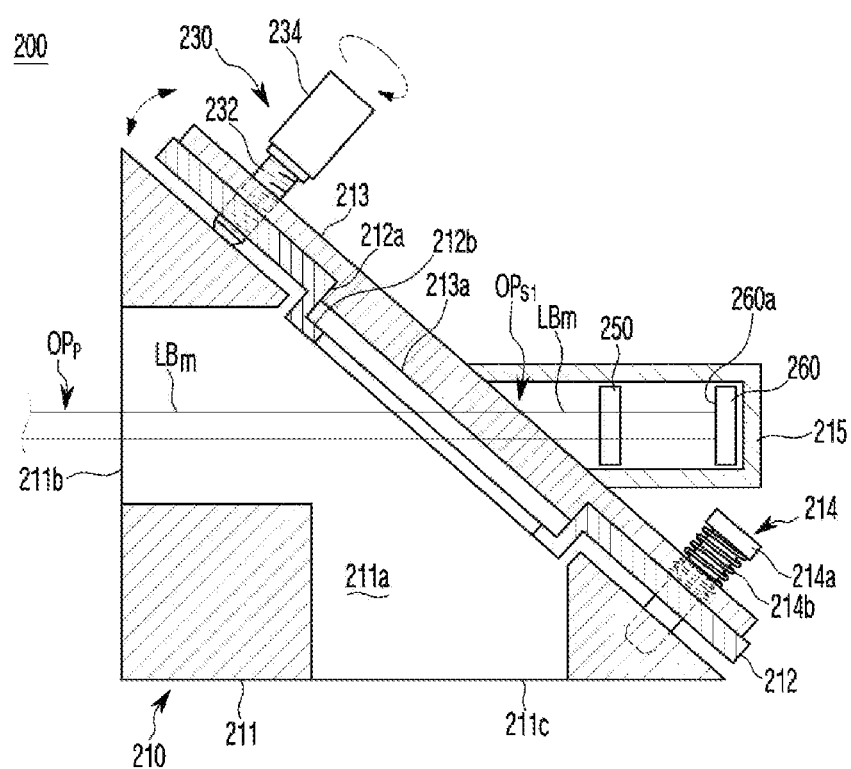

[FIG. 4]
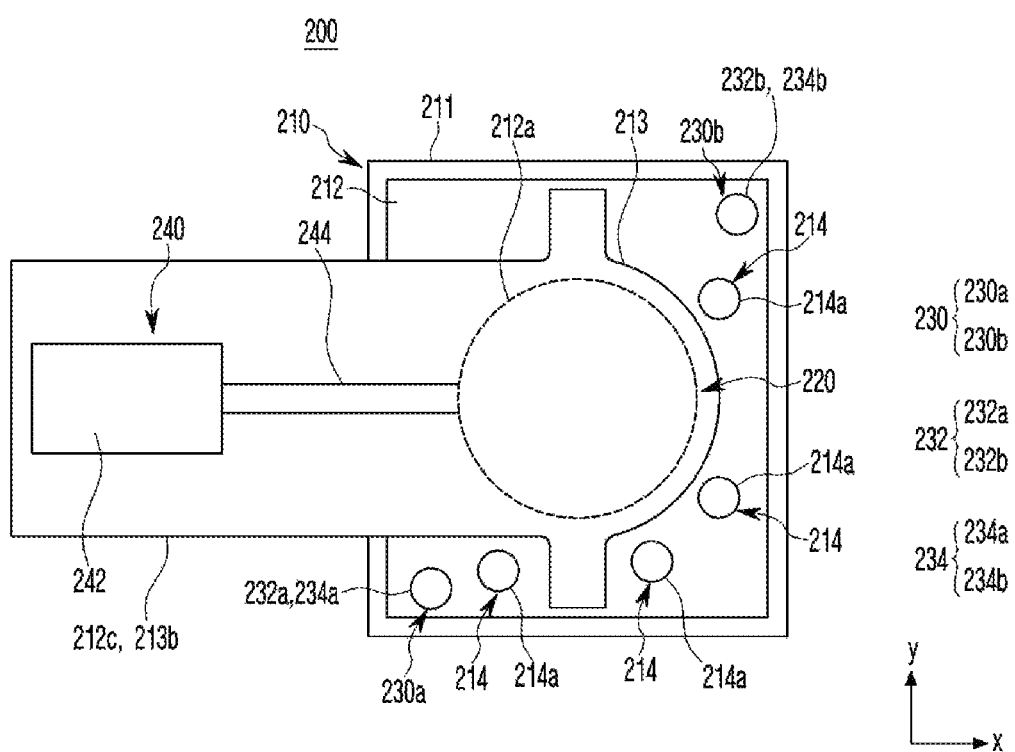

[FIG. 5]
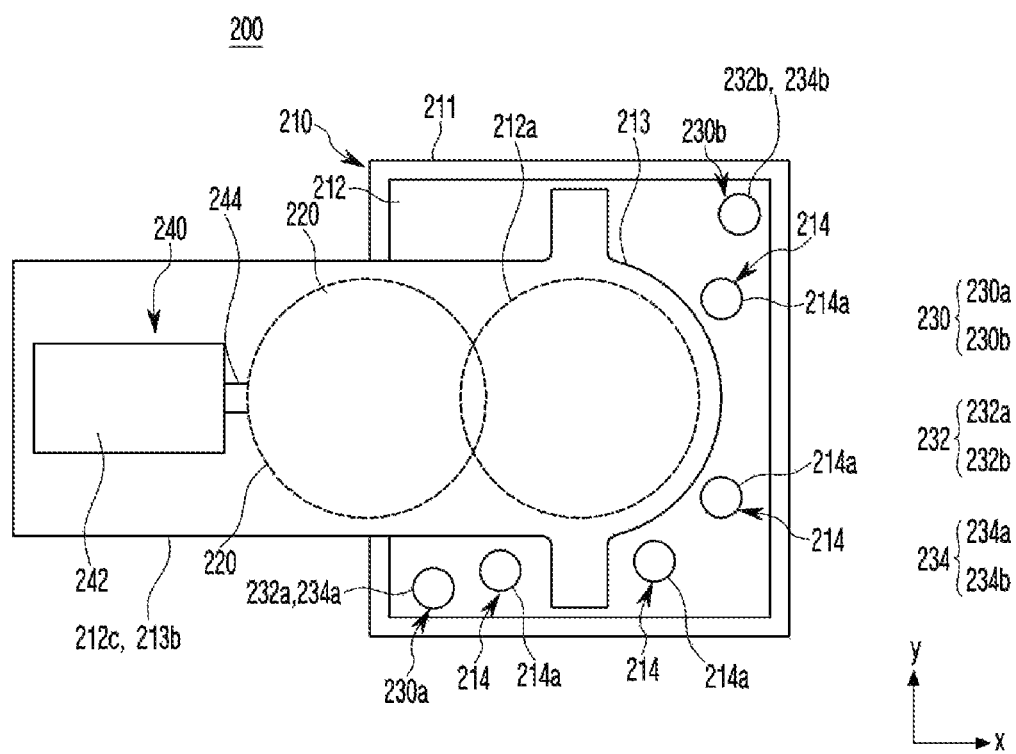

[FIG. 6]
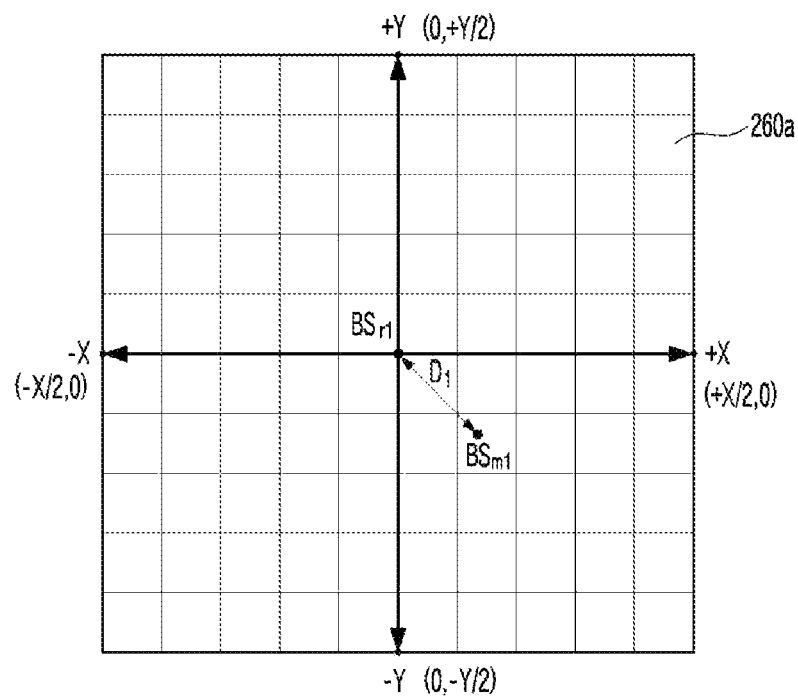

[FIG. 7]
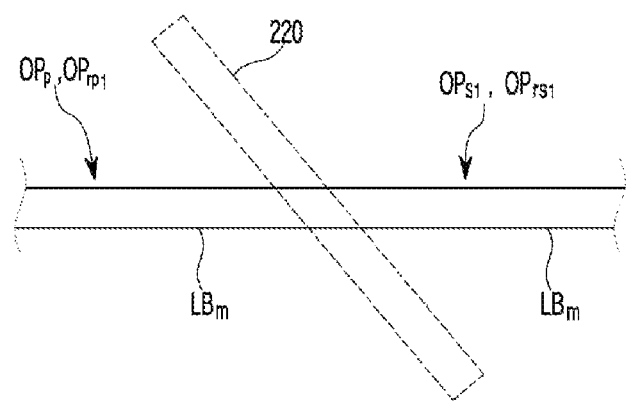

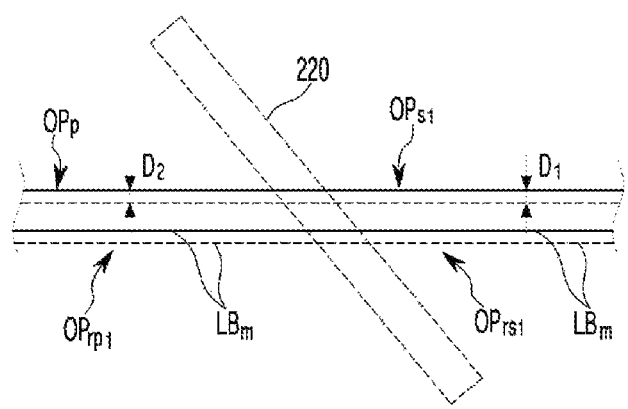
[FIG. 8]

[FIG. 9]
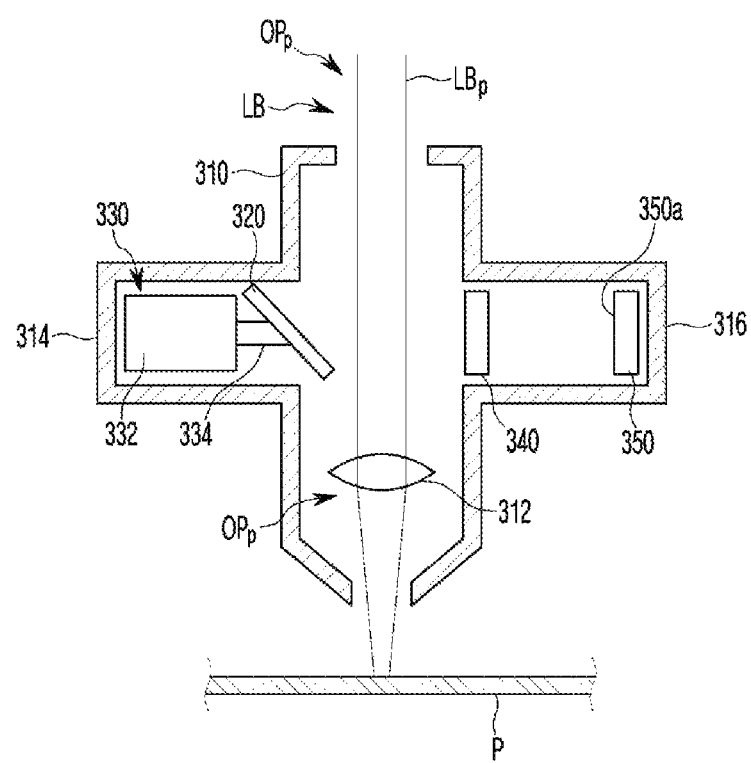

[FIG. 10]
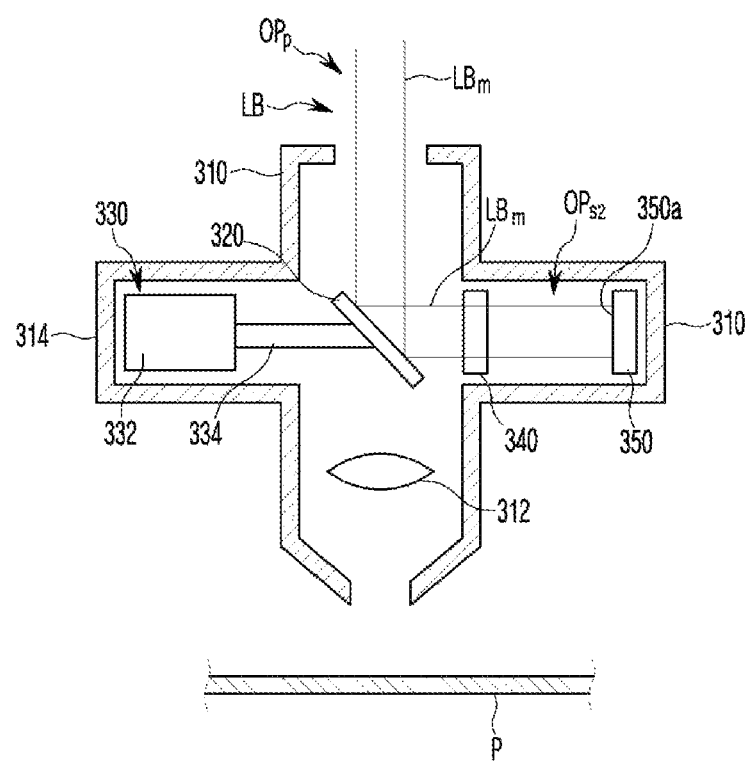

[FIG. 11]
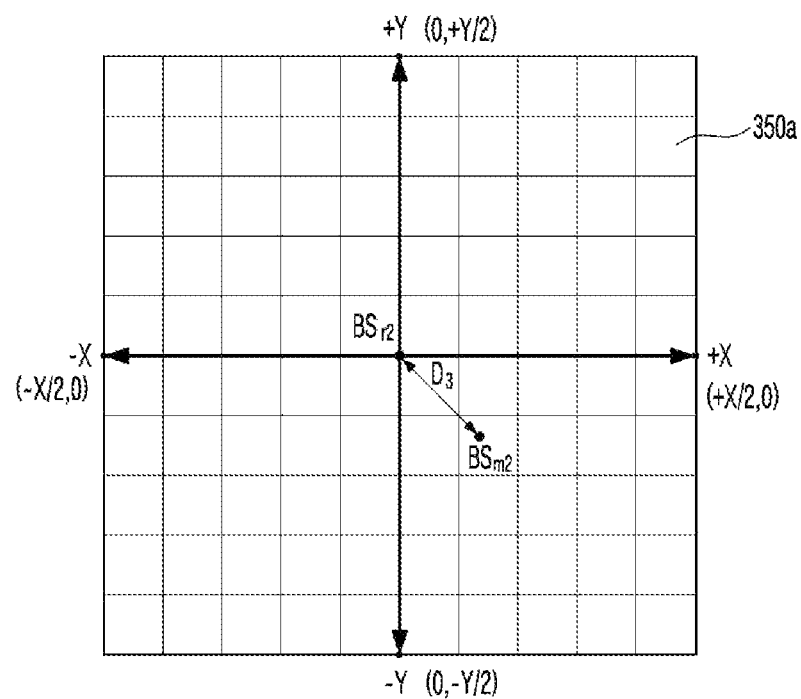

[FIG. 12]
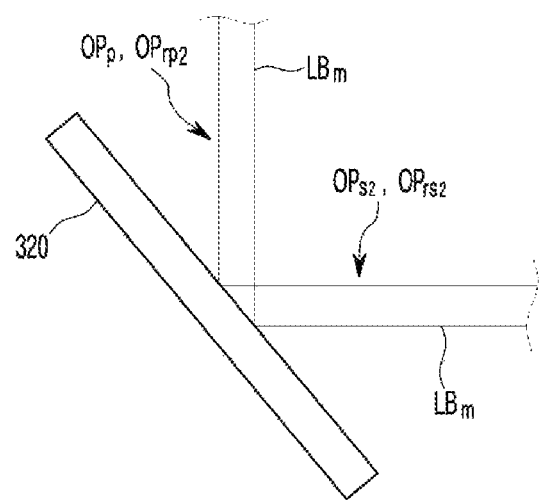

[FIG. 13]
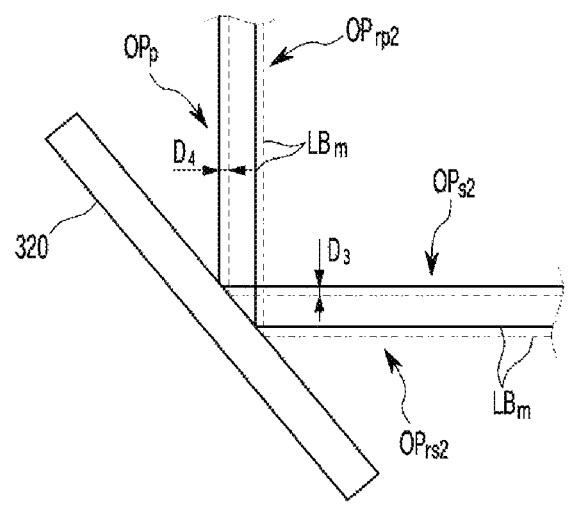

[FIG. 14]
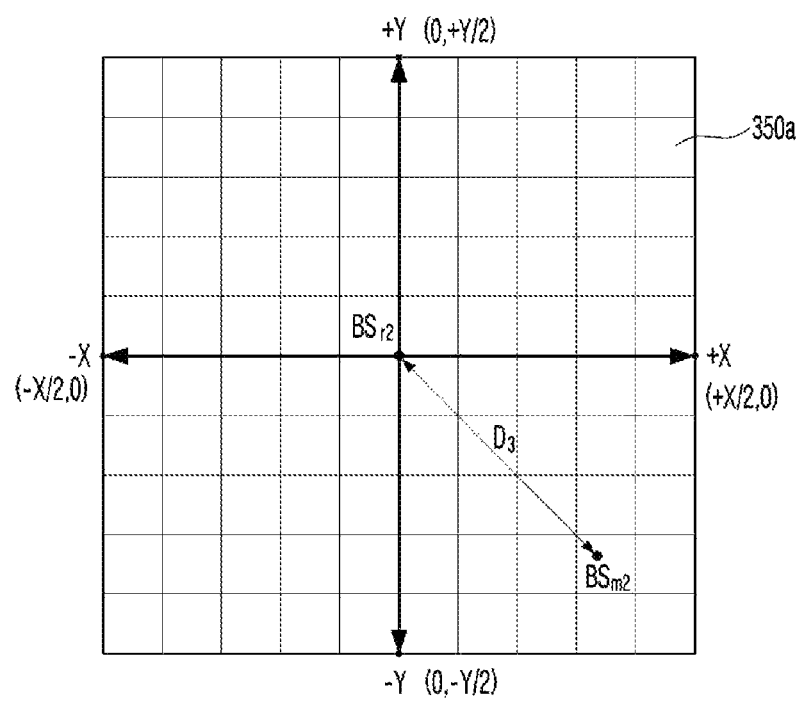

[FIG. 15]
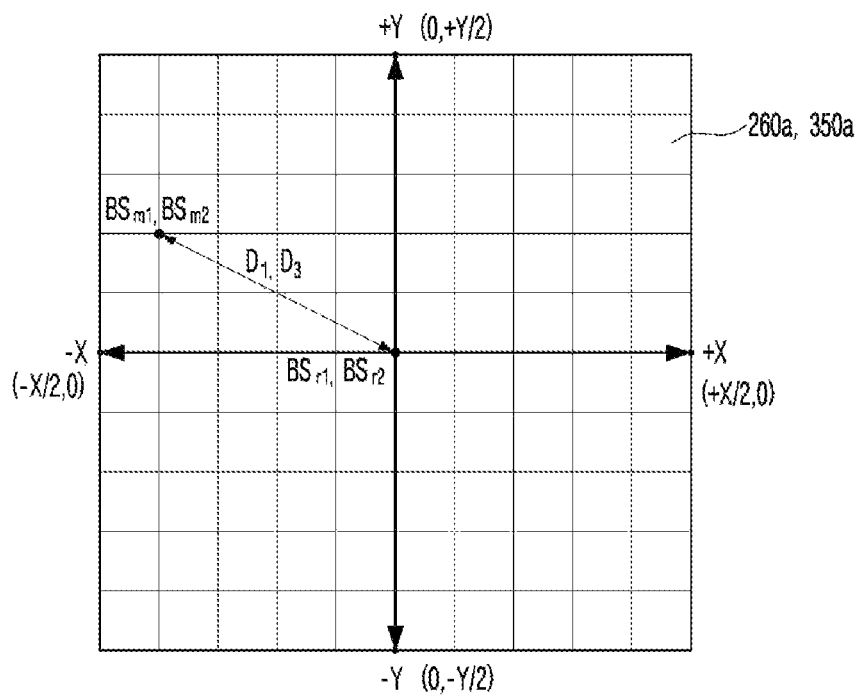

[FIG. 16]
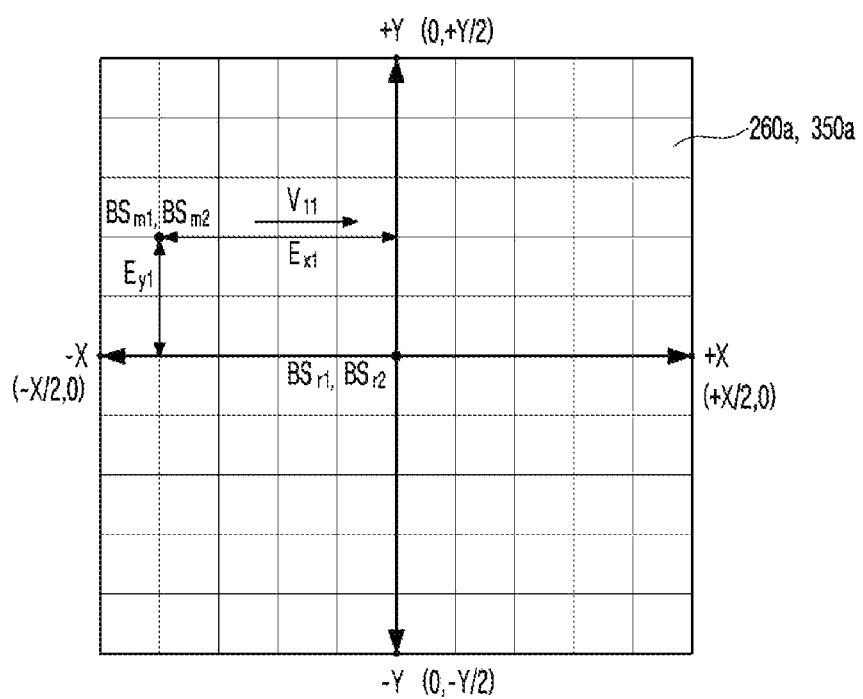

[FIG. 17]
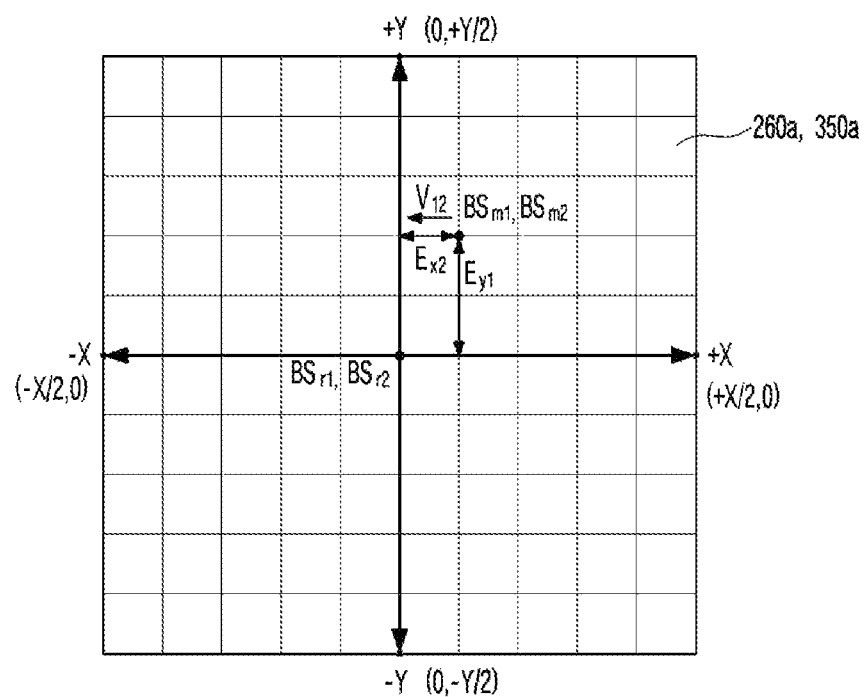

[FIG. 18]
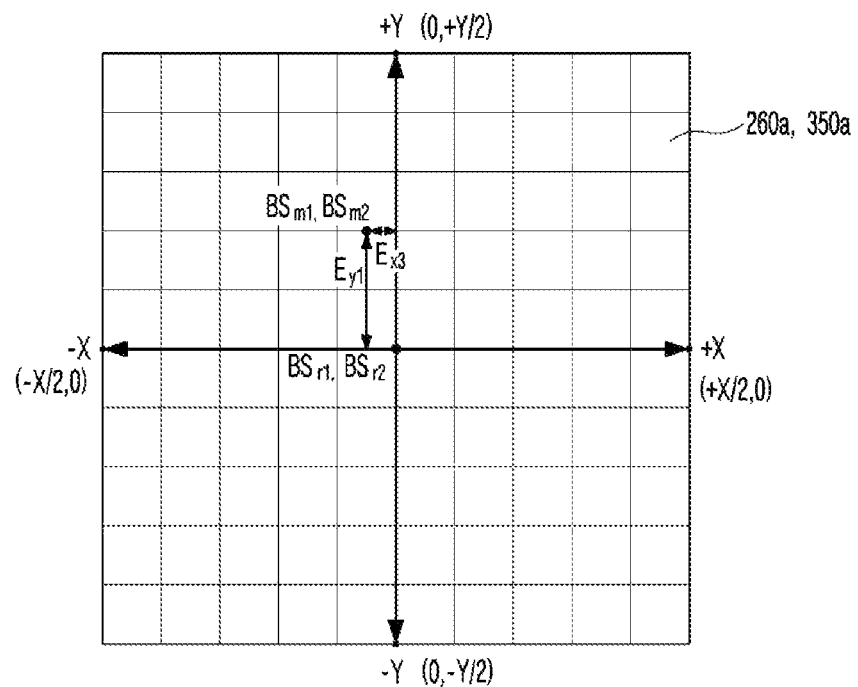

[FIG. 19]
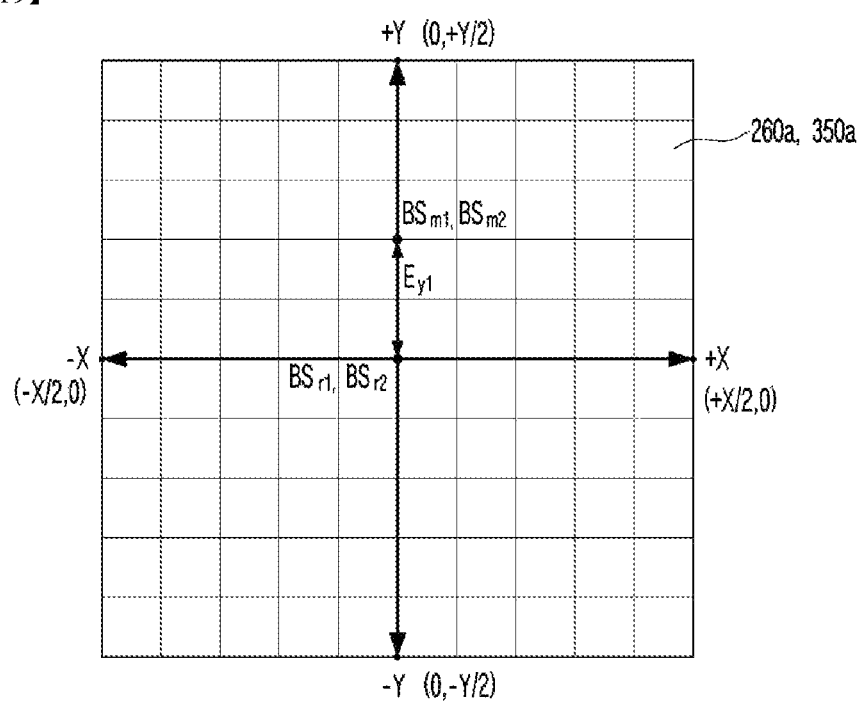

[FIG. 20]
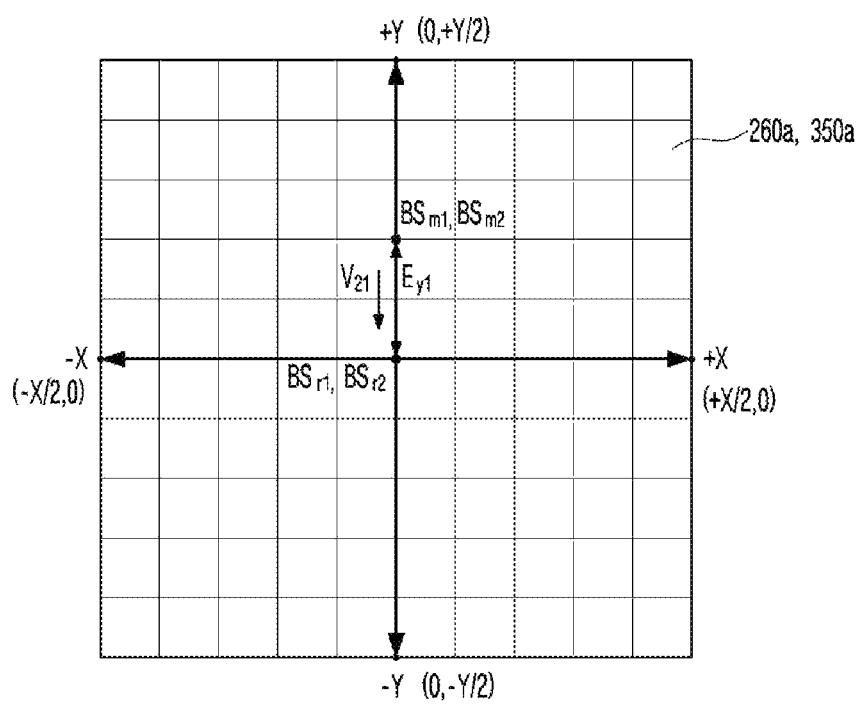

[FIG. 21]
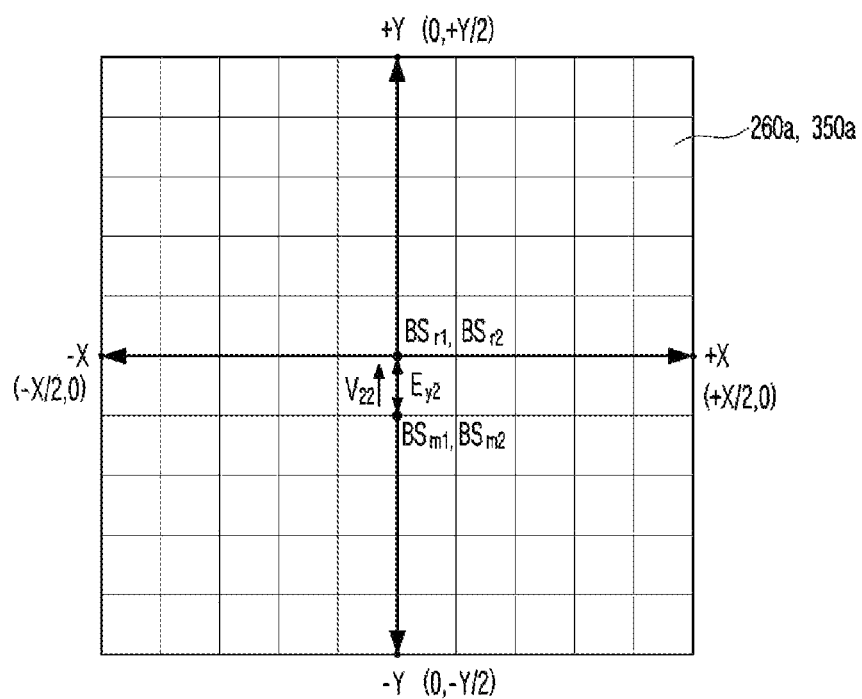

[FIG. 22]
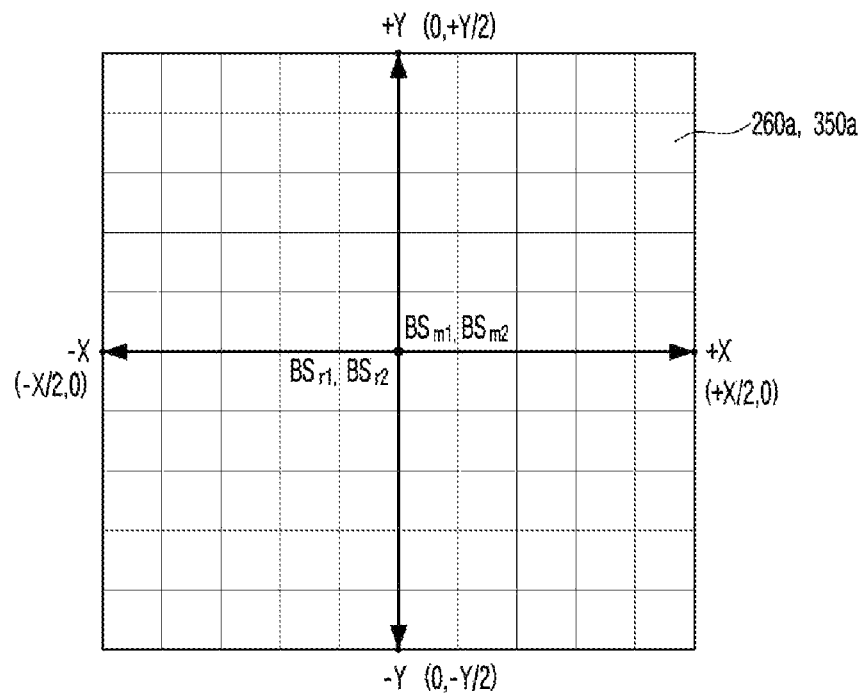

[FIG. 23]
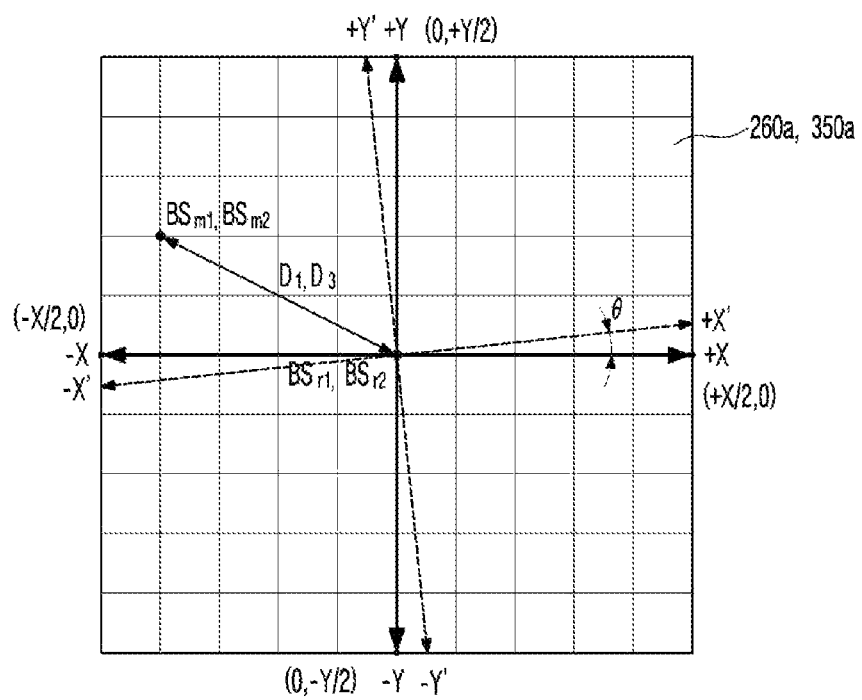

[FIG. 24]
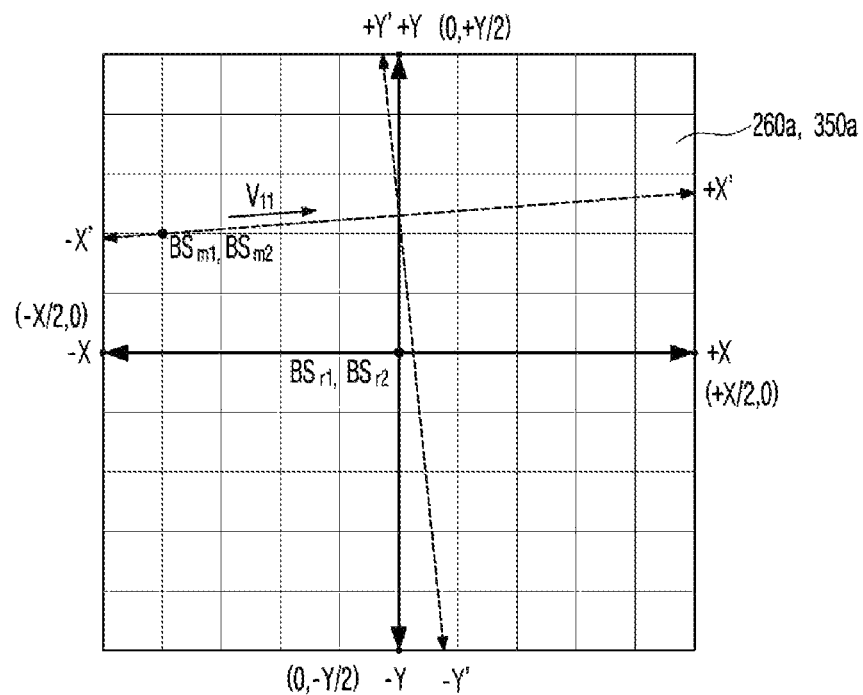

[FIG. 25]
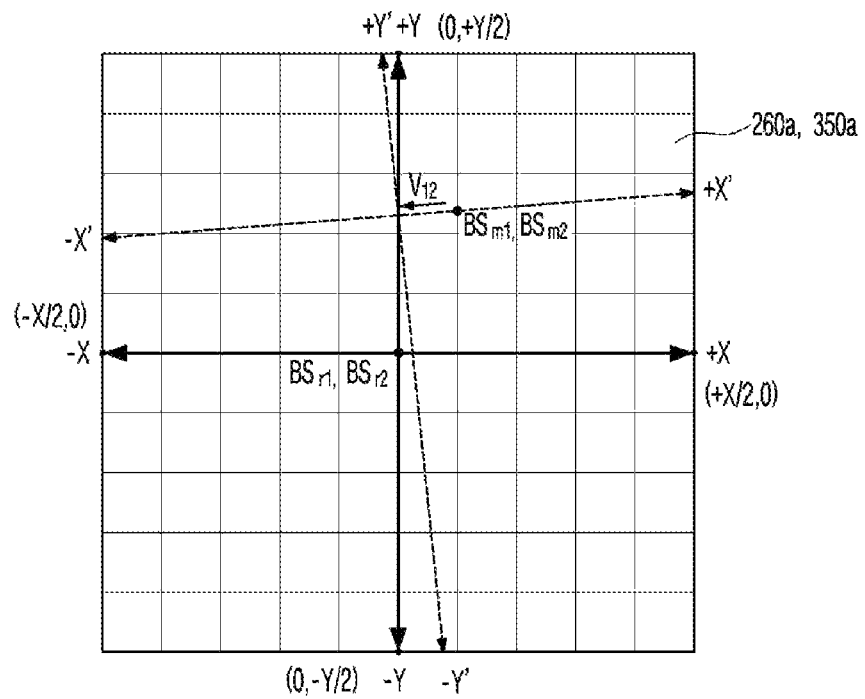

[FIG. 26]
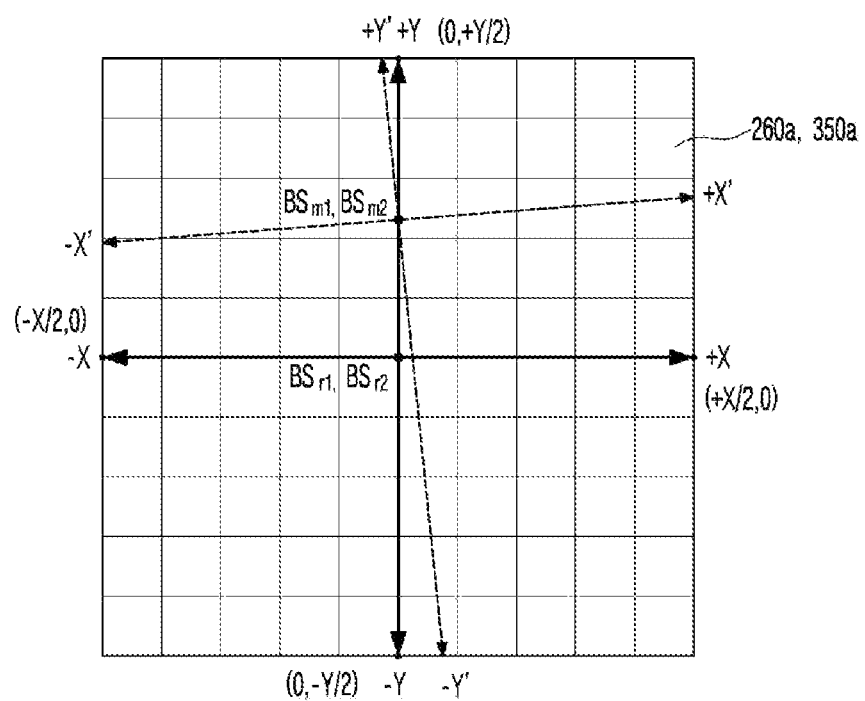

[FIG. 27]
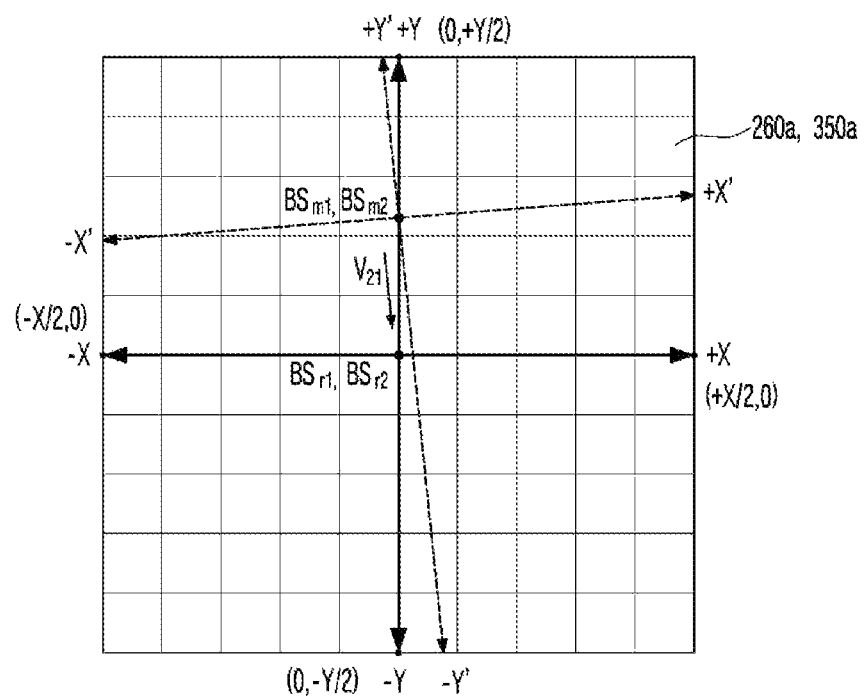

[FIG. 28]
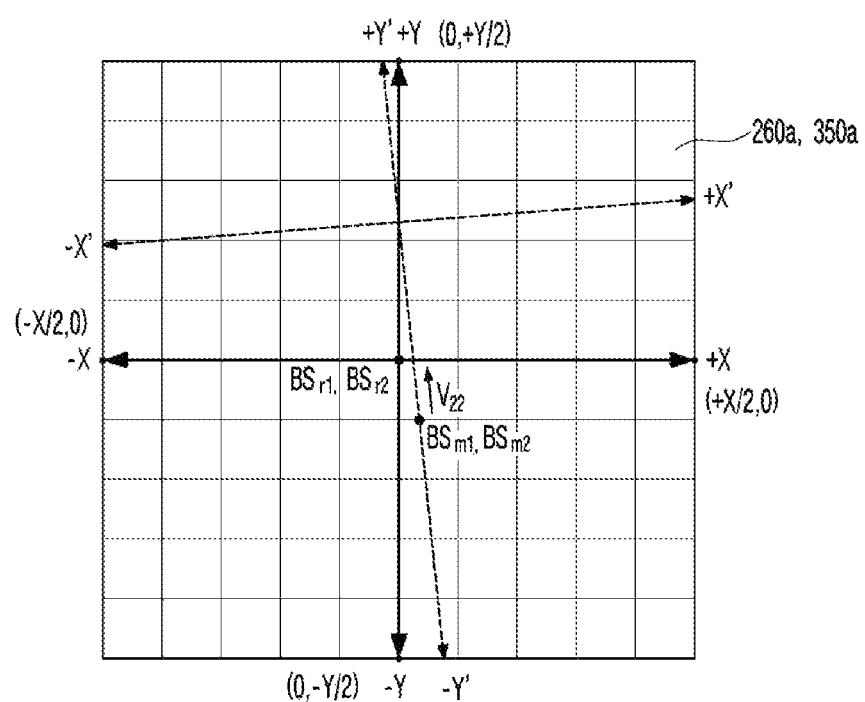

[FIG. 29]
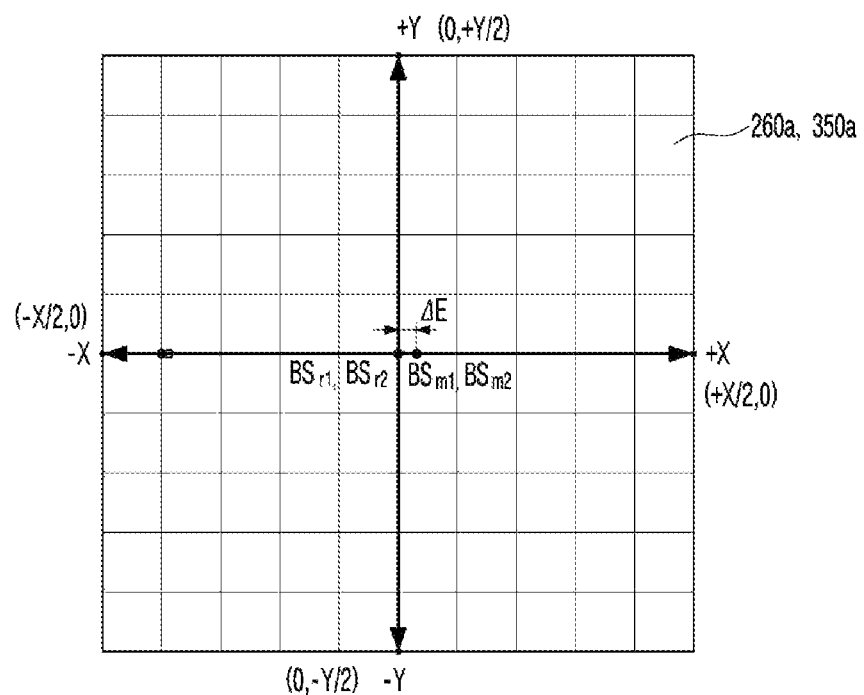

[FIG. 30]
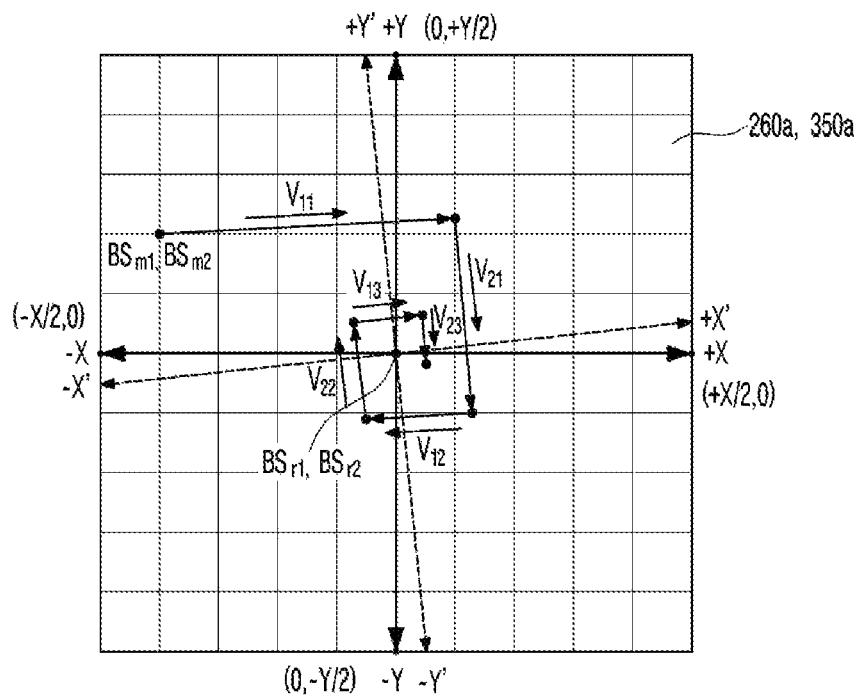

LASER APPARATUS

CROSS-REFERENCE TO RELATED APPLICATION

This application claims priority to Korean Patent Application No. 10-2019-0124959, filed on Oct. 9, 2019, Korean Patent Application No. 10-2019-0167604, filed on Dec. 16, 2019, in the Korean Intellectual Property Office, the disclosure of which is incorporated herein by reference.

BACKGROUND OF THE DISCLOSURE

Field of the Disclosure

The present disclosure relates to a laser apparatus.

Description of the Related Art

In recent years, in the field of processing apparatuses such as cutting apparatuses and marking apparatuses, use of laser apparatuses using laser beams having excellent physical properties is increasing.

In general, a laser apparatus includes a laser oscillator for generating and oscillating a laser beam, an optical system for transmitting the laser beam oscillated from the laser oscillator according to a predetermined transmission method, a laser nozzle for condensing the laser beam transmitted through the optical system and radiating the laser beam onto a processing target, and the like.

Meanwhile, when the optical path of a laser beam is distorted due to change in alignment of optical members included in the optical system due to external force and vibration applied from the outside, wear and aging of the components of the laser apparatus, and other causes, a laser beam is transmitted to the laser nozzle while deviating from a predetermined reference optical path. As a result, a location that deviates from the predetermined processing location of the processing target is irradiated with the laser beam emitted from the laser nozzle, causing deterioration in the processing quality of a processing target.

However, since a conventional laser apparatus does not include a configuration capable of examining and correcting distortion of the optical path of a laser beam, the conventional laser apparatus cannot cope with distortion of the optical path of the laser beam.

SUMMARY OF THE DISCLOSURE

Therefore, the present disclosure has been made in view of the above problems, and it is an object of the present disclosure to provide a laser apparatus having an improved structure capable of automatically examining distortion of the optical path of a laser beam.

It is another object of the present disclosure to provide a laser apparatus having an improved structure capable of automatically correcting distortion of the optical path of a laser beam.

In accordance with one aspect of the present disclosure, provided is a laser apparatus including a laser oscillator for oscillating a laser beam; a mirror mount assembly including a mount-side reflective mirror for transmitting the laser beam by reflecting the laser beam; an aligner including a dial that is configured to change alignment of the mount-side reflective mirror according to a rotation angle and a rotation direction and is responsible for adjusting, by a degree of displacement of a reflection angle of the mount-side reflective mirror according to change in the alignment state, a processing optical path through which the laser beam travels, and a driving motor for driving rotation of the dial; an examination module for calculating optical path difference between a predetermined reference processing optical path and the processing optical path and examining whether optical path distortion occurs on the processing optical path; a calculation module for, when the optical path difference exceeds predetermined reference optical path difference, calculating a target driving speed and target driving time of the driving motor for changing alignment of the mount-side reflective mirror to correct the optical path distortion so that the optical path difference is less than or equal to the predetermined reference optical path difference; and a controller for driving the driving motor according to the target driving speed and the target driving time, wherein the examination module recalculates optical path difference between the reference processing optical path and the processing optical path that has been changed by the driving motor according to the target driving speed and the target driving time and re-examines whether the optical path distortion occurs, the calculation module recalculates the target driving speed and the target driving time based on the recalculated optical path difference when the recalculated optical path difference exceeds the reference optical path difference, and the controller drives the driving motor again according to the recalculated target driving speed and target driving time.

Preferably, re-examination of the optical path distortion and re-correction of the target driving speed, the target driving time, and the optical path distortion may be repeatedly performed until the optical path difference is less than or equal to the predetermined reference optical path difference.

Preferably, the calculation module may calculate the target driving speed and the target driving time in consideration of driving properties of the driving motor that generates difference between an actual driving speed and actual driving time of the driving motor and the target driving speed and target driving time as the controller transmits command signals corresponding to the target driving speed and the target driving time to the driving motor.

Preferably, the laser apparatus may further include a database for storing, as learning data, the optical path difference reoccurring due to difference between the actual driving speed and actual driving time and the target driving speed and target driving time when the controller drives the driving motor to correct the optical path distortion. In this case, the calculation module may calculate the target driving speed and the target driving time based on the learning data.

Preferably, the laser apparatus may further include a laser nozzle assembly including a laser nozzle for radiating the laser beam transmitted along the processing optical path from the mount-side reflective mirror to a processing target, and a nozzle-side sensing member for sensing the laser beam transmitted to the laser nozzle and outputting a nozzle-side sensing signal including vector information of the processing optical path. In this case, the examination module may analyze the nozzle-side sensing signal and calculate the optical path difference.

Preferably, the nozzle-side sensing member may have a nozzle-side sensing surface provided to be irradiated with the laser beam, wherein a coordinate system for specifying a location of a beam spot of the laser beam is set on the nozzle-side sensing surface, and the examination module may calculate the optical path difference based on a location coordinate of a beam spot of the laser beam transmitted to the nozzle-side sensing surface.

Preferably, when a distance between a predetermined nozzle-side reference point and the beam spot on the nozzle-side sensing surface exceeds a predetermined reference interval, the examination module may determine that the optical path distortion has occurred, and the calculation module may calculate the target driving speed and the target driving time to change alignment of the mount-side reflective mirror so that a distance between the nozzle-side reference point and the beam spot is corrected to be less than or equal to the reference interval.

Preferably, the mirror mount assemblies may be installed to be respectively located at any one of predetermined transmission sequences, the aligners may be respectively installed to change alignment of any one mirror mount assembly of the mirror mount assemblies, each of the mirror mount assemblies may further include a mount-side sensing member for sensing the laser beam and outputting a mount-side sensing signal including vector information of the processing optical path, and the examination module may analyze the mount-side sensing signal and calculate the optical path difference.

Preferably, the mount-side sensing member may have a mount-side sensing surface provided to be irradiated with the laser beam, wherein a coordinate system for specifying a location of a beam spot of the laser beam is set on the mount-side sensing surface, and the examination module may calculate the optical path difference based on a location coordinate of a beam spot of the laser beam transmitted to the mount-side sensing surface.

Preferably, when a distance between a predetermined mount-side reference point and the beam spot on the mount-side sensing surface exceeds a predetermined reference interval, the examination module may determine that the optical path distortion has occurred, and the calculation module may calculate the target driving speed and the target driving time to change alignment of the mount-side reflective mirror so that a distance between the mount-side reference point and the beam spot is corrected to be less than or equal to the reference interval.

Preferably, the examination module may examine whether the optical path distortion occurs at the mount-side reflective mirror of the mirror mount assembly located at any one sequence of the transmission sequences by analyzing the mount-side sensing signal output from the mount-side sensing member of the mirror mount assembly located at a sequence following the any one sequence, and upon determining that the optical path distortion occurs at the mount-side reflective mirror of the mirror mount assembly located at the any one sequence, the calculation module may calculate the target driving speed and the target driving time of the driving motor of an aligner capable of changing alignment of the mount-side reflective mirror of the mirror mount assembly located at the any one sequence among the aligners.

Preferably, the examination module may examine whether optical path distortion occurs at a mount-side reflective mirror of each of the mount-side assemblies according to the transmission sequences.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 illustrates a schematic configuration of a laser apparatus according to a preferred embodiment of the present disclosure;

FIG. 2 shows a partial cross-sectional view of a mirror mount assembly;

FIG. 3 shows a partial cross-sectional view of a mirror mount assembly in a state in which a mount-side reflective mirror is drawn out of a processing optical path;

FIG. 4 is a top view of a mirror mount assembly;

FIG. 5 is a top view of a mirror mount assembly in a state in which a mount-side reflective mirror is drawn out of a processing optical path;

FIG. 6 is a drawing for explaining a method of deriving a mount-side sensing optical path using a mount-side sensor;

FIG. 7 is a drawing showing a state in which a processing optical path and a mount-side sensing optical path are formed when a laser beam is transmitted to a mirror mount assembly without optical path distortion;

FIG. 8 is a drawing showing a state in which a processing optical path and a mount-side sensing optical path are formed when a laser beam is transmitted to a mirror mount assembly while an optical path is distorted;

FIG. 9 is a partial cross-sectional view of a laser nozzle assembly, showing a schematic configuration of the laser nozzle assembly;

FIG. 10 is a partial cross-sectional view showing a state in which the nozzle-side reflective mirror shown in FIG. 9 is inserted into the processing optical path;

FIG. 11 is a drawing for explaining a method of deriving a nozzle-side sensing optical path using a nozzle-side sensor;

FIG. 12 is a drawing showing a state in which a processing optical path and a nozzle-side sensing optical path are formed when a laser beam is transmitted to a laser nozzle assembly without optical path distortion;

FIG. 13 is a drawing showing a state in which a processing optical path and a nozzle-side sensing optical path are formed when a laser beam is transmitted to a laser nozzle assembly while an optical path is distorted;

FIG. 14 is a drawing for explaining a method of examining whether optical path distortion occurs in a laser apparatus;

FIGS. 15 to 22 are drawings for explaining a first method of correcting optical path distortion using an aligner;

FIGS. 23 to 29 are drawings for explaining a second method of correcting optical path distortion using an aligner; and FIG. 30 is a drawing for explaining a third method of correcting optical path distortion using an aligner.

DETAILED DESCRIPTION OF THE DISCLOSURE

Hereinafter, the embodiments of the present disclosure will be described in detail with reference to the attached drawings. Here, when reference numerals are applied to constituents illustrated in each drawing, it should be noted that like reference numerals indicate like elements throughout the specification. In addition, in the following description of the present disclosure, a detailed description of known functions and configurations incorporated herein will be omitted when it may make the subject matter of the present disclosure unclear.

In describing the components of the embodiments of the present disclosure, terms such as first, second, A, B, (a), and (b) may be used. These terms are used to distinguish each component from other components, and the nature or order of the components is not limited by these terms. In addition, unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a schematic configuration of a laser apparatus according to a preferred embodiment of the present disclosure.

Referring to FIG. 1, a laser apparatus 1 according to a preferred embodiment of the present disclosure may include a laser oscillator 10 for oscillating a laser beam LB; an optical system 20 for sequentially transmitting the laser beam LB transmitted from the laser oscillator 10 according to predetermined reference transmission sequences S and providing information on the optical path of the laser beam LB; a laser nozzle assembly 30 for condensing the laser beam LB transmitted from the optical system 20, radiating the laser beam LB onto a processing target P, and providing information on the optical path of the laser beam LB; a controller 40 for correcting distortion of the optical path of the laser beam LB by controlling overall driving of the laser apparatus 1 based on information on the optical path of the laser beam LB provided from the optical system 20 and the laser nozzle assembly 30; and the like.

First, the laser oscillator 10 is provided to oscillate the laser beam LB along the processing optical path $OP_p$. The laser beam LB oscillated from the laser oscillator 10 passes through the optical system 20 and the laser nozzle assembly 30 in sequence, and then the processing target P is irradiated with the laser beam LB. In this case, the optical path through which the laser beam LB passes is referred to as the processing optical path $OP_p$. The processing optical path $OP_p$ may be changed depending on alignment of a mount-side reflective mirror 220 to be described later and other members that affect the processing optical path $OP_p$.

In addition, the laser oscillator 10 is provided to selectively oscillate any one of processing light $LB_p$ and instruction light $LB_m$ having different wavelength bands along the processing optical path $OP_p$. In addition, the laser oscillator 10 may be provided so that the processing light $LB_p$ and the instruction light $LB_m$ have the same optical axis. With this configuration, the processing light $LB_p$ and the instruction light $LB_m$ oscillated from the laser oscillator 10 may be transmitted along the same optical path, i.e., the processing optical path $OP_p$.

The processing light $LB_p$ is a laser beam for laser processing of the processing target P and has a wavelength band absorbed by the processing target P by a predetermined reference absorption rate or more. The types of laser beams used as the processing light $LB_p$ are not particularly limited. At least one of various types of laser beams may be used as the processing light $LB_p$ according to the type of the processing target P.

The instruction light $LB_m$ is a laser beam for examining the optical path of the laser beam LB and has a visible light wavelength band that allows a beam spot of the laser beam to be observed with the naked eye or photographed with a camera. In particular, the instruction light $LB_m$ preferably has a lower output than the processing light $LB_p$ to prevent damage to the sensors 260 and 350 to be described later by the instruction light $LB_m$, but the present disclosure is not limited thereto. The types of laser beams used as the instruction light $LB_m$ are not particularly limited. At least one of various types of laser beams may be used as the instruction light $LB_m$ according to the types of the sensors 260 and 350 to be described later.

The controller 40 may control the laser oscillator 10 to selectively oscillate any one of the processing light $LB_p$ and the instruction light $LB_m$ according to predetermined process conditions. For example, when laser processing of the processing target P is performed, the controller 40 may control the laser oscillator 10 to oscillate the processing light $LB_p$. For example, when examination of the optical path of the laser beam LB is performed, the controller 40 may control the laser oscillator 10 to oscillate the instruction light $LB_m$.

In addition, it has been described that the controller 40 selectively oscillates any one of the processing light $LB_p$ and the instruction light $LB_m$, but the present disclosure is not limited thereto. That is, the controller 40 may be provided to selectively oscillate other types of laser beams in addition to the processing light $LB_p$ and the instruction light $LB_m$.

Next, the optical system 20 is installed between the laser oscillator 10 and the laser nozzle assembly 30 to allow the laser beam LB oscillated from the laser oscillator 10 to be transmitted to the laser nozzle assembly 30 along the processing optical path $OP_p$. For this configuration, as shown in FIG. 1, the optical system 20 may include a mirror mount assembly 200 to be described later having the mount-side reflective mirror 220.

The number of the mirror mount assemblies 200 is not particularly limited. For example, the optical system 20 may include a plurality of mirror mount assemblies 200. With this configuration, the laser beam LB may be sequentially reflected in the reference transmission sequences S by a plurality of mount-side reflective mirrors 220 to be transmitted along the processing optical path $OP_p$. As shown in FIG. 1, the mirror mount assemblies 200 may each be disposed at any one of the reference transmission sequences S, so that the laser beam LB may be sequentially transmitted along the reference transmission sequences S. In addition, the mirror mount assemblies 200 are preferably installed so that the installation directions and heights thereof are different from each other. With this configuration, the laser beam LB may be reflected by the mount-side reflective mirrors 220 to be described later so that the extension direction of the processing optical path $OP_p$ may be changed to a predetermined direction. The specific structure of the mirror mount assemblies 200 will be described later.

Next, the laser nozzle assembly 30 is installed so that the processing target P is irradiated with the laser beam LB transmitted along the processing optical path $OP_p$ from the optical system 20. The specific structure of the laser nozzle assembly 30 will be described later.

FIG. 2 shows a partial cross-sectional view of a mirror mount assembly, and FIG. 3 shows a partial cross-sectional view of a mirror mount assembly in a state in which a mount-side reflective mirror is drawn out of a processing optical path.

FIG. 4 is a top view of a mirror mount assembly, and FIG. 5 is a top view of a mirror mount assembly in a state in which a mount-side reflective mirror is drawn out of a processing optical path.

As shown in FIGS. 2 to 5, each of the mirror mount assemblies 200 may include a mirror mount 210; the mount-side reflective mirror 220 for transmitting the laser beam LB along the processing optical path $OP_p$ by reflecting the laser beam LB; an aligner 230 for adjusting the reflection angle of the mount-side reflective mirror 220 by changing alignment of the mount-side reflective mirror 220; a mount-side transport member 240 for selectively guiding the laser beam LB traveling along the processing optical path $OP_p$ to a mount-side sensing optical path $OP_{s1}$ by reciprocating the mount-side reflective mirror 220 along a predetermined transport path; a noise filter 250 for removing noise included in the laser beam LB traveling along the mount-side sensing optical path $OP_{s1}$; a mount-side sensor 260 for sensing the laser beam LB passing through the noise filter 250 and outputting a mount-side optical path signal including vector information of the mount-side sensing optical path $OP_{s1}$; and the like.

The mirror mount 210 is provided to support the mount-side reflective mirror 220 so that the laser beam LB transmitted along the processing optical path $OP_p$ is incident on the mount-side reflective mirror 220. That is, the mirror mount 210 is provided to support the mount-side reflective mirror 220 so that the laser beam LB transmitted along the processing optical path $OP_p$ from the laser oscillator 10 or the mirror mount assembly 200 located at a sequence immediately before the mirror mount assembly 200 including the mirror mount 210 among the reference transmission sequences S is incident on the mount-side reflective mirror 220.

The structure of the mirror mount 210 is not particularly limited. For example, as shown in FIG. 2, the mirror mount 210 may include abase block 211 that provides paths for the processing light $LB_p$ and other laser beams; a mirror plate 212 configured so that the mount-side reflective mirror 220 is installed thereon and disposed so that the laser beam LB passing through the base block 211 is incident on the mount-side reflective mirror 220; a fixing block 213 mounted on the mirror plate 212 to fasten the mount-side reflective mirror 220; a fastening member 214 for fastening the base block 211 and the mirror plate 212; a sensor block 215 configured so that the mount-side sensor 260 is installed therein; and the like.

As shown in FIG. 2, a laser path 211a through which the laser beam LB passes may be formed inside the base block 211. The base block 211 is preferably fixed to a predetermined location using bolts or other fixing members, without being limited thereto.

The laser path 211a has a shape corresponding to the processing optical path $OP_p$ of the laser beam LB without particular limitation. For example, as shown in FIG. 2, when the mount-side reflective mirror 220 is installed to vertically change the extension direction of the processing optical path $OP_p$ by changing the travel direction of the laser beam LB to a vertical direction, the laser path 211a may have an 'L' shape. Then, the laser beam LB transmitted along the processing optical path $OP_p$ from the laser oscillator 10 or the mirror mount assembly 200 located at the immediately preceding sequence enters the laser path 211a through an opening 211b formed on one side of the laser path 211a and is incident on the mount-side reflective mirror 220. In addition, the laser beam LB reflected by the mount-side reflective mirror 220 travels along the processing optical path $OP_p$, the extension direction of which is changed vertically, and is emitted through the other opening 211c of the laser path 211a.

As shown in FIG. 2, the mirror plate 212 may include an opening 212a formed to allow insertion of the mount-side reflective mirror 220, a flange 212b formed to protrude from the inner circumferential surface of the opening 212a to support the mount-side reflective mirror 220 inserted into the opening 212a, and the like. The mirror plate 212 may be fastened to one surface of the base block 211 by the fastening member 214 to be described later.

The opening 212a has a shape corresponding to the mount-side reflective mirror 220 to allow the mount-side reflective mirror 220 to be inserted thereinto. The flange 212b is formed to protrude from the inner surface of the opening 212a by a predetermined length to support the outer peripheral portion of the mount-side reflective mirror 220 inserted into the opening 212a. Accordingly, the mount-side reflective mirror 220 may be detachably mounted on the mirror plate 212 by being inserted into the opening 212a so that the outer peripheral portion is supported by the flange 212b.

As shown in FIG. 2, the fixing block 213 may have a pressing portion 213a formed to protrude from one side thereof to be inserted into the opening 212a. The fixing block 213 is preferably screwed to one surface of the mirror plate 212 using bolts (not shown), without being limited thereto.

The pressing portion 213a may be formed to protrude from one surface of the fixing block 213 by a predetermined height to contact the mount-side reflective mirror 220 inserted into the opening 212a. The pressing portion 213a may press the mount-side reflective mirror 220 inserted into the opening 212a to fix the mount-side reflective mirror 220 in a state in which the mount-side reflective mirror 220 is in close contact with the flange 212b. Accordingly, the pressing portion 213a may prevent the mount-side reflective mirror 220 from moving inside the opening 212a due to external force or vibration applied from the outside. In addition, through a contact surface in contact with the mount-side reflective mirror 220, the pressing portion 213a may receive heat applied to the mount-side reflective mirror 220 by the laser beam LB. Thereby, the fixing block 213 may prevent the mount-side reflective mirror 220 from being damaged by high temperature by dissipating heat transferred from the mount-side reflective mirror 220 to the outside.

In addition, the fixing block 213 is preferably formed to transmit the instruction light $LB_m$ but absorb the processing light $LB_p$. For this purpose, the fixing block 213 may be formed of glass or a material that selectively transmits the instruction light $LB_m$. In particular, to selectively transmit the instruction light $LB_m$, the incident surface of the fixing block 213 facing the mount-side reflective mirror 220 and the exit surface of the fixing block 213 facing the noise filter 250 to be described later may be subjected to non-reflective coating. Then, as shown in FIG. 3, when the mount-side reflective mirror 220 is drawn out of the processing optical path $OP_p$ by the mount-side transport member 240 to be described later, the instruction light $LB_m$ passing through the opening 212a may pass through the fixing block 213, may be guided to the mount-side sensing optical path $OP_{s1}$, and then may be directed toward the mount-side sensor 260.

The fastening member 214 has a configuration capable of fastening the mirror plate 212 to the base block 211. For example, as shown in FIG. 3, the fastening member 214 may include a fastening bolt 214a that has a threaded portion passing through the mirror plate 212 and is screwed to one surface of the base block 211, a spring 214b interposed between the head of the fastening bolt 214a and the mirror plate 212, and the like. The spring 214b is preferably a compression coil spring, without being limited thereto.

The number of the fastening members 214 is not particularly limited. For example, as shown in FIG. 4, a plurality of fastening members 214 may be installed at predetermined intervals.

Due to this configuration including the fastening member 214, the mirror plate 212 is elastically pressed toward one surface of the base block 211 by elastic force provided from the spring 214b. Thereby, the fastening member 214 may elastically fasten the mirror plate 212 and the base block 211.

As shown in FIG. 3, the sensor block 215 is mounted on one surface of the fixing block 213 so that the instruction light $LB_m$ passing through the fixing block 213 enters the sensor block 215. The sensor block 215 is preferably screwed to one surface of the fixing block 213 using bolts or other fastening members (not shown), without being limited thereto. Inside the sensor block 215, the noise filter 250, the mount-side sensor 260, and the like to be described later may be installed at predetermined intervals.

As shown in FIG. 2, the mount-side reflective mirror 220 has a shape corresponding to the opening 212a of the mirror plate 212. The types of reflective mirrors that may be used as the mount-side reflective mirror 220 are not particularly limited, and the mount-side reflective mirror 220 may be configured as a conventional reflective mirror that totally reflects a laser beam.

The mount-side reflective mirror 220 is installed to totally reflect, at a predetermined reflection angle, the laser beam LB transmitted along the processing optical path $OP_p$ from the laser oscillator 10 or the mirror mount assembly 200 located at the immediately preceding sequence. Thereby, the mount-side reflective mirror may change the extension direction of the processing optical path $OP_p$ by the reflection angle of the mount-side reflective mirror 220. For example, as shown in FIG. 2, the mount-side reflective mirror 220 may be installed to totally reflect the laser beam LB, so that the extension direction of the processing optical path $OP_p$ is vertically changed. According to this configuration including the mount-side reflective mirror 220, when laser processing of the processing target P is performed, the processing light $LB_p$ oscillated from the laser oscillator 10 may be sequentially transmitted in the reference transmission sequences S by the mount-side reflective mirrors 220 included in each of the mirror mount assemblies 200 and then may be transmitted to the laser nozzle assembly 30.

The aligner 230 is configured to be able to change alignment of the mirror mount 210 and the mount-side reflective mirror 220 mounted on the mirror mount 210. The structure of the aligner 230 is not particularly limited. For example, as shown in FIG. 2, the aligner 230 may include a dial 232 mounted on the mirror plate 212 to change alignment of the mirror plate 212 and the mount-side reflective mirror 220 mounted on the mirror plate 212 according to rotation directions and rotation angles; a driving motor 234 for driving rotation of the dial 232; and the like.

As shown in FIG. 2, the dial 232 may have a bolt shape with a thread formed on the outer circumferential surface thereof. The dial 232 may be screwed to the mirror plate 212 so that an end portion thereof is in contact with one surface of the base block 211 in a pressing manner.

The driving motor 234 may be coupled to the dial 232 via a shaft to drive rotation of the dial 232. The types of motors that may be used as the driving motor 234 are not particularly limited. That is, various types of motors such as an ultrasonic motor, a servo motor, and a stepper motor may be used as the driving motor 234.

When rotation of the dial 232 is driven by the driving motor 234, the mirror plate 212 may be gradually moved to be close to the base block 211 by a predetermined distance or to be separated from the base block 211 according to the rotation direction and rotation angle of the dial 232. Thereby, the aligner 230 may change alignment of the mirror plate 212 and the mount-side reflective mirror 220 mounted on the mirror plate 212 by changing the angle between the base block 211 and the mirror plate 212 around the fastening member 214. Then, the reflection angle of the mount-side reflective mirror 220 with respect to the laser beam LB is adjusted according to the driving manner of the aligner 230, and thus the optical paths of the laser beam LB including the processing optical path $OP_p$ and the mount-side sensing optical path $OP_{s1}$ may be adjusted according to the driving manner of the aligner 230.

The number of the aligners 230 is not particularly limited. For example, as shown in FIG. 4, the aligner 230 may consist of a first aligner 230a for moving the optical paths of the laser beam LB including the processing optical path $OP_p$ and the mount-side sensing optical path $OP_1$ to be described later in the X-direction perpendicular to the Y-direction by changing the angle between the base block 211 and the mirror plate 212 around the Y axis; and a second aligner 230b for moving the optical paths of the laser beam LB including the processing optical path $OP_p$ and the mount-side sensing optical path $OP_{s1}$ to be described later in the Y-direction by changing the angle between the base block 211 and the mirror plate 212 around the X-axis.

In addition, the first aligner 230a may include a first dial 232a for moving the optical path of the laser beam LB in the X-direction by changing the angle between the base block 211 and the mirror plate 212 around the Y axis according to rotation directions and rotation angles; a first driving motor 234a for driving rotation of the first dial 232a; and the like.

In addition, the second aligner 230b may include a second dial 232b for moving the optical path of the laser beam LB in the Y-direction by changing the angle between the base block 211 and the mirror plate 212 around the X-axis according to rotation directions and rotation angles; a second driving motor 234b for driving rotation of the second dial 232b; and the like.

According to this configuration including the first aligner 230a and the second aligner 230b, the optical paths of the laser beam LB may be individually adjusted in the X-direction or the Y-direction according to the driving manners of the first aligner 230a and the second aligner 230b.

The mount-side transport member 240 is provided to transport the mount-side reflective mirror 220 in a reciprocating manner along a predetermined transport path, so that the mount-side reflective mirror 220 is inserted into the processing optical path $OP_p$ or is drawn out of the processing optical path $OP_p$. The types of transport members that may be used as the mount-side transport member 240 are not particularly limited. For example, the mount-side transport member 240 may be configured as a cylinder apparatus. In this case, as shown in FIG. 4, the mount-side transport member 240 may include a cylinder body 242 for providing driving force; a cylinder rod 244 that is reciprocally transported along a predetermined transport path by the cylinder body 242 and is coupled to the mount-side reflective mirror 220; and the like.

The transport path of the mount-side reflective mirror 220 is determined so that the mount-side reflective mirror 220 is inserted into the processing optical path $OP_p$ or is drawn out of the processing optical path $OP_p$. In this case, the transport path of the mount-side reflective mirror 220 is determined so that the mount-side reflective mirror 220 does not interfere with a sensor block 15, the noise filter 250 installed in the sensor block 15, and the mount-side sensor 260. For example, as shown in FIGS. 4 and 5, the transport path of the mount-side reflective mirror 220 may be determined so that the mount-side reflective mirror 220 is reciprocally transported in the width direction. For this purpose, the mirror plate 212 may have an extension portion 212c formed to extend toward the transport direction of the mount-side reflective mirror 220 (for example, the width direction of the mount-side reflective mirror 220). Correspondingly, the fixing block 213 may have an extension portion 213b formed to extend toward the transport direction of the mount-side reflective mirror 220 (for example, the width direction of the mount-side reflective mirror 220). The extension portions 212c and 213b are provided so that a travel path communicating with the opening 212a of the mirror plate 212 and a space on which the mount-side transport member 240 is installed are formed between the extension portions 212c and 213b, so that the mount-side reflective mirror 220 moves along a predetermined transport path.

When the mount-side transport member 240 is installed and the extension portions 212c and 213b are provided as described above, the mount-side reflective mirror 220 may be selectively inserted into the processing optical path $OP_p$ or may be drawn out of the processing optical path $OP_p$ using the mount-side transport member 240 according to the driving mode of the laser apparatus 1.

For example, as shown in FIGS. 2 and 4, when the processing light $LB_p$ is oscillated from the laser oscillator 10 to perform laser processing of the processing target P, the mount-side reflective mirror 220 may be inserted into the processing optical path $OP_p$ by the mount-side transport member 240. Then, the processing light $LB_p$ transmitted along the processing optical path $OP_p$ is totally reflected by the mount-side reflective mirror 220, and thus the extension direction of the processing optical path $OP_p$ may be changed by the reflection angle of the mount-side reflective mirror 220.

For example, as shown in FIGS. 3 and 5, when the instruction light $LB_m$ is oscillated from the laser oscillator 10 to examine the optical path of the laser beam LB, the mount-side reflective mirror 220 may be drawn out of the processing optical path $OP_p$ by the mount-side transport member 240. Then, as shown in FIG. 3, the instruction light $LB_m$ transmitted along the processing optical path $OP_p$ to the mirror mount assembly 200 passes through the fixing block 213 and is guided to the mount-side sensing optical path $OP_{s1}$. Here, the mount-side sensing optical path $OP_{s1}$ means an optical path formed when the instruction light $LB_m$ passes through the fixing block 213 without being reflected by the mount-side reflective mirror 220. A first predetermined correlation is formed between the mount-side sensing optical path $OP_{s1}$ and the processing optical path $OP_p$. For example, as shown in FIGS. 2 and 3, the mount-side sensing optical path $OP_{s1}$ is placed in a straight line with the processing optical path $OP_p$ in a section before an extension direction is changed by the mount-side reflective mirror 220, and the mount-side sensing optical path $OP_{s1}$ forms the same angle as the reflection angle of the mount-side reflective mirror 220 with the processing optical path $OP_p$ in a section after an extension direction is changed by a predetermined reflection angle by the mount-side reflective mirror 220.

As shown in FIG. 3, the noise filter 250 is installed between the fixing block 213 and the mount-side sensor 260 so that the instruction light $LB_m$ guided to the mount-side sensing optical path $OP_{s1}$ after passing through the fixing block 213 is incident. The noise filter 250 may remove noise included in the instruction light $LB_m$ so that the instruction light $LB_m$ is formed in a shape suitable for examining the optical path of the laser beam LB. The noise filter 250 removes noise from the instruction light $LB_m$ guided to the mount-side sensing optical path $OP_{s1}$ and transmits the instruction light $LB_m$ to the mount-side sensor 260. Thereby, when examining the optical path of the laser beam LB, occurrence of errors due to noise may be prevented.

The mount-side sensor 260 may sense the instruction light $LB_m$ from which noise has been removed by the noise filter 250 and may output a mount-side optical path signal including the vector information of the mount-side sensing optical path $OP_{s1}$. The mount-side optical path signal may include the location coordinate, extension direction, and vector information of the mount-side sensing optical path $OP_{s1}$. As shown in FIG. 3, to sense the instruction light $LB_m$, the mount-side sensor 260 may have a mount-side sensing surface 260a provided to be irradiated with the instruction light $LB_m$ passing through the noise filter 250.

FIG. 6 is a drawing for explaining a method of deriving a mount-side sensing optical path using a mount-side sensor, FIG. 7 is a drawing showing a state in which a processing optical path and a mount-side sensing optical path are formed when a laser beam is transmitted to a mirror mount assembly without optical path distortion, and FIG. 8 is a drawing showing a state in which a processing optical path and a mount-side sensing optical path are formed when a laser beam is transmitted to a mirror mount assembly while an optical path is distorted.

As shown in FIG. 6, the mount-side sensor 260 is provided to sense the location of a mount-side test beam spot $BS_{m1}$ of the instruction light $LB_m$ transmitted to the mount-side sensing surface 260a. The mount-side sensing surface 260a is formed as a 2D plane having a predetermined sensing area, and an XY coordinate system capable of specifying the location coordinate of the mount-side test beam spot $BS_{m1}$ on the mount-side sensing surface 260a may be set on the mount-side sensing surface 260a.

To sense the location coordinate of the mount-side test beam spot $BS_{m1}$, the mount-side sensor 260 may include any one of a camera for capturing an image of the mount-side test beam spot $BS_{m1}$, a PSD sensor for outputting a location detection signal corresponding to the location of the mount-side test beam spot $BS_{m1}$, and various sensors capable of providing information on the location of the mount-side test beam spot $BS_{m1}$. In particular, when the mount-side sensor 260 includes a camera, a CCD camera is preferably used, without being limited thereto.

The mount-side optical path signal output from the mount-side sensor 260 may be used to examine the optical path of the laser beam LB. For this purpose, as shown in FIG. 1, the laser apparatus 1 may further include an examination module 50 for analyzing the mount-side optical path signal output from the mount-side sensor 260 to examine the optical path of the laser beam LB.

Referring to FIG. 6, the examination module 50 may derive the vector of the mount-side sensing optical path $OP_{s1}$ based on the location of the mount-side test beam spot $BS_{m1}$ sensed by the mount-side sensor 260, and then may calculate an optical path difference $D_1$ between the mount-side sensing optical path $OP_{s1}$ and a predetermined first reference sensing optical path $OP_{rs1}$. In particular, the examination module 50 may calculate the optical path difference $D_1$ between the mount-side sensing optical path $OP_{s1}$ and the first reference sensing optical path $OP_{rs1}$ using the difference between the location coordinate of the mount-side test beam spot $BS_{m1}$ transmitted to the mount-side sensing surface 260a along the mount-side sensing optical path $OP_{s1}$ and the location coordinate of a mount-side reference beam spot $BS_{r1}$ transmitted to the mount-side sensing surface 260a along the first reference sensing optical path $OP_{rs1}$.

Here, the first reference sensing optical path $OP_{rs1}$ refers to the mount-side sensing optical path $OP_{s1}$ when the laser beam LB is transmitted along a predetermined first reference processing optical path $OP_{rp1}$ from the laser oscillator 10 or the mount-side reflective mirror 220 of the mirror mount assembly 200 located at the immediately preceding sequence. In addition, the first reference processing optical path $OP_{rp1}$ refers to the processing optical path $OP_p$ through which the laser beam LB travels when the laser beam LB is transmitted from the laser oscillator 10 or the mount-side reflective mirror 220 of the mirror mount assembly 200 located at the immediately preceding sequence without optical path distortion. As described above, a first correlation is formed between the mount-side sensing optical path $OP_{s1}$ and the processing optical path $OP_p$. Thus, the first reference sensing optical path $OP_{rs1}$ may also be set so that a first correlation is formed between the first reference sensing optical path $OP_{rs1}$ and the first reference processing optical path $OP_{rp1}$. Then, the location coordinate of the mount-side reference beam spot $BS_{r1}$ may function as a mount-side reference point for examining whether distortion of the optical path of the laser beam LB occurs using the location coordinate of the mount-side test beam spot $BS_{m1}$.

As shown in FIG. 7, when the instruction light $LB_m$ is transmitted along the processing optical path $OP_p$ that coincides with the first reference processing optical path $OP_{rp1}$, the mount-side sensing optical path $OP_{s1}$ coincides with the first reference sensing optical path $OP_{rs1}$. In addition, as shown in FIG. 8, when the instruction light $LB_m$ is transmitted along the processing optical path $OP_p$ deviated from the first reference processing optical path $OP_{rp1}$ by a predetermined optical path difference $D_2$, the mount-side sensing optical path $OP_{s1}$ and the first reference sensing optical path $OP_{rs1}$ do not coincide with each other by the optical path difference D proportional to the optical path difference $D_2$ between the processing optical path $OP_p$ and the first reference processing optical path $OP_{rp1}$.

The examination module 50 may derive the vector of the processing optical path $OP_p$ by analyzing the vector of the mount-side sensing optical path $OP_{s1}$ using a first correlation. The vector of the processing optical path $OP_p$ derived in this way may include the location coordinate, extension direction, and various data of the processing optical path $OP_p$. Accordingly, the examination module 50 may calculate the optical path difference $D_2$ between the processing optical path $OP_p$ and the first reference processing optical path $OP_{rp1}$ based on the optical path difference $D_1$ between the mount-side sensing optical path $OP_{s1}$ and the first reference sensing optical path $OP_{rs1}$. The optical path difference $D_2$ calculated in this way may correspond to a vector value indicating the absolute value and direction of optical path distortion occurring in the process of transmitting the laser beam LB along the processing optical path $OP_p$ to a mount-side mirror assembly 200 where an optical path is examined.

As described above, the mirror mount assemblies 200 are installed to sequentially transmit the laser beam LB oscillated from the laser oscillator 10 using the mount-side reflective mirrors 220 in the reference transmission sequences S. Accordingly, among the mirror mount assemblies 200, the instruction light $LB_m$ oscillated from the laser oscillator 10 is transmitted along the processing optical path $OP_p$ to the mirror mount assembly 200 located at a first sequence among the reference transmission sequences S. In addition, among the mirror mount assemblies 200, the instruction light $LB_m$ reflected by the mount-side reflective mirror 220 of the mirror mount assembly 200 located at the immediately preceding sequence is transmitted along the processing optical path $OP_p$ to the mirror mount assembly 200 located at a second sequence or any subsequent sequence thereof among the reference transmission sequences S.

In consideration of the transmission state of the instruction light $LB_m$, the examination module 50 may individually determine, for each of the mirror mount assemblies 200, whether the instruction light $LB_m$ is transmitted along the first reference processing optical path $OP_{rp1}$ in a normal state without optical path distortion based on the vector of the processing optical path $OP_p$, the optical path difference $D_2$, and the like.

As described above, since the laser oscillator 10 oscillates laser beams LB such as the processing light $LB_p$ and the instruction light $LB_m$ so that the laser beams LBs have the same optical axis, the laser beams LB oscillated from the laser oscillator 10 are transmitted along the same processing optical path $OP_p$. Accordingly, the examination module 50 may individually determine, for each of the mirror mount assemblies 200, whether the laser beam LB is transmitted along the first reference processing optical path $OP_{rp1}$ from the laser oscillator 10 or the mirror mount assembly 200 located at the immediately preceding sequence based on the path vector of the processing optical path $OP_p$, the optical path difference $D_2$, and the like.

For example, when the examination module 50 examines the optical path of the laser beam LB for the mirror mount assembly 200 located at a first sequence, when the processing optical path $OP_p$ and the first reference processing optical path $OP_{rp1}$ do not coincide with each other, the examination module 50 may determine that distortion of the processing optical path $OP_p$ occurs due to an abnormal phenomenon in the process of transmitting the laser beam LB to the mirror mount assembly 200 located at the first sequence. The abnormal phenomenon refers to a phenomenon in which alignment of the laser oscillator 10 is defective or distortion of the processing optical path $OP_p$ occurs in the process of transmitting the laser beam LB to the mirror mount assembly 200 located at the first sequence.

For example, when the examination module 50 examines the optical path of the laser beam LB for the mirror mount assembly 200 located at the subsequent sequence, when the processing optical path $OP_p$ and the first reference processing optical path $OP_{rp1}$ do not coincide with each other, the examination module 50 may determine that distortion of the processing optical path $OP_p$ occurs in the process of transmitting the laser beam LB to the mirror mount assembly 200 located at the subsequent sequence. The abnormal phenomenon refers to a phenomenon in which alignment of the laser oscillator 10 is defective, alignment of the mount-side reflective mirror 220 of the mirror mount assembly 200 located at a sequence immediately before the subsequent sequence in the reference transmission sequences S is defective, or distortion of the processing optical path $OP_p$ occurs in the process of transmitting the laser beam LB to the mirror mount assembly 200 located at the subsequent sequence.

In addition, when the optical path difference $D_2$ between the processing optical path $OP_p$ and the first reference processing optical path $OP_{rp1}$ exceeds a predetermined reference optical path difference, the examination module 50 preferably determines that the processing optical path $OP_p$ and the first reference processing optical path $OP_{rp1}$ do not coincide with each other. Physically completely eliminating optical path distortion is difficult due to tolerances in the manufacturing process and errors in the assembly process. Accordingly, only when the optical path difference $D_2$ between the processing optical path $OP_p$ and the first reference processing optical path $OP_{rp1}$ is large enough to adversely affect the processing quality of the processing target P due to distortion of the processing optical path $OP_p$, it is determined that the processing optical path $OP_p$ and the first reference processing optical path $OP_p$, do not coincide with each other.

As described above, the examination module 50 may detect which member causes distortion of the processing optical path $OP_p$ by performing examination of the optical path of the laser beam LB for each of the mirror mount assemblies 200. However, according to the above-described examination method, distortion of the processing optical path $OP_p$ occurring in the mirror mount assembly 200 located at a specific sequence of the reference transmission sequences S may be examined using the mount-side sensor 260 of the mirror mount assembly 200 located at a sequence after the specific sequence (preferably, a sequence immediately after the specific sequence) in the reference transmission sequences S. Accordingly, according to the above-described examination method, distortion of the processing optical path $OP_p$ occurring in the mirror mount assembly 200 located at the last sequence of the reference transmission sequences S may not be detected. A method of detecting distortion of the processing optical path $OP_p$ occurring in the mirror mount assembly 200 located at the last sequence will be described later.

FIG. 9 is a partial cross-sectional view of a laser nozzle assembly, showing a schematic configuration of the laser nozzle assembly, and FIG. 10 is a partial cross-sectional view showing a state in which the nozzle-side reflective mirror shown in FIG. 9 is inserted into the processing optical path.

As shown in FIG. 9, the laser nozzle assembly 30 may include a laser nozzle 310; a nozzle-side reflective mirror 320 for selectively guiding the laser beam LB transmitted along the processing optical path $OP_p$ to a nozzle-side sensing optical path $OP_{s2}$; a nozzle-side transport member 330 for reciprocally transporting the nozzle-side reflective mirror 320 on a predetermined path so that the nozzle-side reflective mirror 320 is inserted into the processing optical path $OP_p$ or is drawn out of the processing optical path $OP_p$; a noise filter 340 for removing noise included in the laser beam LB traveling along the nozzle-side sensing optical path $OP_{s2}$; a nozzle-side sensor 350 for sensing the laser beam LB from which noise has been removed by the noise filter 340 and outputting a nozzle-side optical path signal including the vector information of the nozzle-side sensing optical path $OP_{s2}$; and the like.

As shown in FIG. 9, the laser nozzle 310 has a hollow shape so that the laser beam LB transmitted along the processing optical path $OP_p$ from the mount-side reflective mirror 220 of the mirror mount assembly 200 located at the last sequence enters the interior of the laser nozzle 310. The laser nozzle 310 may include a lens 312 capable of condensing the laser beam LB entering the interior of the laser nozzle 310. As shown in FIG. 9, the condensing lens 312 is preferably installed to condense the laser beam LB directly transmitted without being reflected by the nozzle-side reflective mirror 320 to be described later, without being limited thereto. That is, when the laser nozzle 310 is provided so that the processing target P is irradiated with the laser beam LB reflected by the nozzle-side reflective mirror 320, the condensing lens 312 may be installed to condense the laser beam LB reflected by the nozzle-side reflective mirror 320. For convenience of explanation, hereinafter, the present disclosure will be described on the basis of a case wherein the condensing lens 312 is installed so that the laser beam LB directly transmitted without being reflected by the nozzle-side reflective mirror 320 is incident on the condensing lens 312.

The laser nozzle 310 may further include a beam expander (not shown) installed to expand the diameter of the laser beam LB entering the interior of the laser nozzle 310 at a predetermined ratio so that the laser beam LB is transmitted to the condensing lens 312, and various optical members (not shown) capable of shaping the laser beam LB according to the processing purpose of the processing target P.

As shown in FIG. 9, the laser nozzle 310 may radiate the processing light $LB_p$ condensed by the condensing lens 312 along the processing optical path $OP_p$ to the processing target P so that the processing target P is laser-processed.

The nozzle-side reflective mirror 320 is installed inside the laser nozzle 310 so that the laser beam LB entering the interior of the laser nozzle 310 along the processing optical path $OP_p$ is incident on the nozzle-side reflective mirror 320. In this case, the nozzle-side reflective mirror 320 is installed to totally reflect the laser beam LB by a predetermined reflection angle. For example, as shown in FIG. 10, the nozzle-side reflective mirror 320 may be installed so that total reflection is possible so that the travel direction of the laser beam LB entering the interior of the laser nozzle 310 along the processing optical path $OP_p$ is changed vertically. The types of reflective mirrors that may be used as the nozzle-side reflective mirror 320 are not particularly limited, and the nozzle-side reflective mirror 320 may be configured as a conventional reflective mirror that totally reflects a laser beam.

As shown in FIG. 10, the nozzle-side reflective mirror 320 is preferably installed closer to the optical system 20 than the condensing lens 312 so that the laser beam LB not reaching the condensing lens 312 is incident, but the present disclosure is not limited thereto.

The nozzle-side transport member 330 is provided to transport the nozzle-side reflective mirror 320 in a reciprocating manner along a predetermined transport path so that the nozzle-side reflective mirror 320 is inserted into the processing optical path $OP_p$ or is drawn out of the processing optical path $OP_p$. The types of transport members that may be used as the nozzle-side transport member 330 are not particularly limited. For example, the nozzle-side transport member 330 may be configured as a cylinder apparatus. In this case, as shown in FIGS. 9 and 10, the nozzle-side transport member 330 may include a cylinder body 332 for providing driving force; a cylinder rod 334 configured to be reciprocally transported along a predetermined transport path by the cylinder body 332 and be coupled to the nozzle-side reflective mirror 320; and the like.

The transport path of the nozzle-side reflective mirror 320 is determined so that the nozzle-side reflective mirror 320 is inserted into the processing optical path $OP_p$ or is drawn out of the processing optical path $OP_p$. In this case, the transport path of the nozzle-side reflective mirror 320 is determined so that the nozzle-side reflective mirror 320 does not interfere with the noise filter 340 to be described later, the nozzle-side sensor 350, and the like. For example, as shown in FIGS. 9 and 10, the transport path of the nozzle-side reflective mirror 320 may be determined so that the nozzle-side reflective mirror 320 is reciprocally transported in a direction horizontal to the laser nozzle 310. For this purpose, on one side wall of the laser nozzle 310, a first extension portion 314 extending in the transport direction of the nozzle-side reflective mirror 320 (for example, a direction horizontal to the laser nozzle 310) may be formed. The first extension portion 314 has a predetermined volume so that a travel path communicating with the inside of the laser nozzle 310 and a space where the nozzle-side transport member 330 is installed are formed inside the first extension portion 314 so that the nozzle-side reflective mirror 320 is capable of traveling along a predetermined transport path.

In addition, corresponding to the first extension portion 314, a second extension portion 316 extending in a predetermined extension direction may be formed on the other wall of the laser nozzle 310 opposite to one side wall of the laser nozzle 310. The extension direction of the second extension portion 316 is not particularly limited. When the nozzle-side sensor 350 is provided to sense the laser beam LB totally reflected by the nozzle-side reflective mirror 320, the second extension portion 316 may be formed to extend in the travel direction of the laser beam LB reflected by the nozzle-side reflective mirror 320. For example, as shown in FIG. 10, when the nozzle-side reflective mirror 320 is provided so that the travel direction of the laser beam LB is changed to the vertical direction, the second extension portion 316 may be formed to extend in a direction horizontal to the laser nozzle 310. Inside the second extension portion 316, the noise filter 340 to be described later, the nozzle-side sensor 350, and the like may be installed at predetermined intervals.

When the nozzle-side transport member 330 is installed and the first extension portion 314 is provided, the nozzle-side reflective mirror 320 may be selectively inserted into the processing optical path $OP_p$ or may be drawn out of the processing optical path $OP_p$ using the nozzle-side transport member 330 according to the driving mode of the laser apparatus 1.

For example, as shown in FIG. 9, when the processing light $LB_p$ is oscillated from the laser oscillator 10 to perform laser processing of the processing target P, the nozzle-side transport member 330 may draw the nozzle-side reflective mirror 320 out of the processing optical path $OP_p$. Then, as shown in FIG. 9, the processing light $LB_p$ may travel along the processing optical path $OP_p$ without being reflected by the nozzle-side reflective mirror 320, and then may reach the processing target P.

For example, as shown in FIG. 10, when the instruction light $LB_m$ is oscillated from the laser oscillator 10 to examine the optical path of the laser beam LB, the nozzle-side transport member 330 may draw the nozzle-side reflective mirror 320 out of the processing optical path $OP_p$. Then, as shown in FIG. 10, the laser beam LB transmitted along the processing optical path $OP_p$ is totally reflected by the nozzle-side reflective mirror 320 and is guided to the nozzle-side sensing optical path $OP_{s2}$. The instruction light $LB_m$ is totally reflected by the nozzle-side reflective mirror 320 so that the travel direction of the instruction light $LB_m$ is changed by a predetermined reflection angle, and then the reflected instruction light $LB_m$ enters the nozzle-side sensing optical path $OP_{s2}$. Accordingly, a predetermined second correlation is formed between the nozzle-side sensing optical path $OP_{s2}$ and the processing optical path $OP_p$. For example, as shown in FIG. 10, when the nozzle-side reflective mirror 320 is installed so that the travel direction of the laser beam LB is changed in a vertical direction, the nozzle-side sensing optical path $OP_{s2}$ is formed to be perpendicular to the processing optical path $OP_p$.

As shown in FIG. 10, the noise filter 340 is installed between the nozzle-side reflective mirror 320 and the nozzle-side sensor 350 so that the instruction light $LB_m$ guided to the nozzle-side sensing optical path $OP_{s2}$ is incident. In this case, the noise filter 340 is installed to be located inside the second extension portion 316. The noise filter 340 may remove noise included in the instruction light $LB_m$ so that the instruction light $LB_m$ is formed in a shape suitable for examining the optical path of the laser beam LB. The noise filter 340 removes noise from the instruction light $LB_m$ guided to the nozzle-side sensing optical path $OP_{s2}$ and transfers the instruction light $LB_m$ to the nozzle-side sensor 350. Thereby, when the optical path of the laser beam LB is examined, occurrence of errors due to noise may be prevented.

The nozzle-side sensor 350 may sense the instruction light $LB_m$ from which noise has been removed by the noise filter 340, and may output a nozzle-side optical path signal including the vector information of the nozzle-side sensing optical path $OP_{s2}$. The nozzle-side optical path signal may include the location coordinate, extension direction, and vector information of the nozzle-side sensing optical path $OP_{s2}$. As shown in FIG. 10, the nozzle-side sensor 350 may have a nozzle-side sensing surface 350a provided to be irradiated with the instruction light $LB_m$ passing through the noise filter 340 to sense the instruction light $LB_m$.

FIG. 11 is a drawing for explaining a method of deriving a nozzle-side sensing optical path using a nozzle-side sensor, FIG. 12 is a drawing showing a state in which a processing optical path and a nozzle-side sensing optical path are formed when a laser beam is transmitted to a laser nozzle assembly without optical path distortion, and FIG. 13 is a drawing showing a state in which a processing optical path and a nozzle-side sensing optical path are formed when a laser beam is transmitted to a laser nozzle assembly while an optical path is distorted.

As shown in FIG. 11, the nozzle-side sensor 350 may be provided to sense the location of a nozzle-side test beam spot $BS_{m2}$ of the instruction light $LB_m$ transmitted to the nozzle-side sensing surface 350a. Here, the nozzle-side sensing surface 350a of the nozzle-side sensor 350 may be formed as a 2D plane having a predetermined sensing area, and an XY coordinate system capable of specifying the location coordinate of the nozzle-side test beam spot $BS_{m2}$ on the nozzle-side sensing surface 350a may be set on the nozzle-side sensing surface 350a.

To sense the location coordinate of the nozzle-side test beam spot $BS_{m2}$, the nozzle-side sensor 350 may include at least one of a camera for capturing an image of the nozzle-side test beam spot $BS_{m2}$, a PSD sensor for outputting a location detection signal corresponding to the location of the nozzle-side test beam spot $BS_{m2}$, and various sensors capable of providing information on the location of the nozzle-side test beam spot $BS_{m2}$. In particular, when the nozzle-side sensor 350 includes a camera, a CCD camera is preferably used, without being limited thereto.

As described above, the examination module 50 may perform examination of the optical path of the laser beam LB by analyzing a nozzle-side optical path signal output from the nozzle-side sensor 350.

As shown in FIG. 11, the examination module 50 may derive the vector of the nozzle-side sensing optical path $OP_{s2}$ based on the location of the nozzle-side test beam spot $BS_{m2}$ sensed by the nozzle-side sensor 350, and then may calculate an optical path difference $D_3$ between the nozzle-side sensing optical path $OP_{s2}$ and a predetermined second reference sensing optical path $OP_{rs2}$. In particular, the examination module 50 may calculate the optical path difference $D_3$ between the nozzle-side sensing optical path $OP_{s2}$ and the second reference sensing optical path $OP_{rs2}$ using the difference between the location coordinate of the nozzle-side test beam spot $BS_{m2}$ transmitted to the nozzle-side sensing surface 350a along the nozzle-side sensing optical path $OP_{s2}$ and the location coordinate of a nozzle-side reference beam spot $BS_{r2}$ of the instruction light $LB_m$ transmitted to the nozzle-side sensing surface 350a along the second reference sensing optical path $OP_{rs2}$.

Here, the second reference sensing optical path $OP_{r2}$ refers to an optical path when the laser beam LB is transmitted along a second reference processing optical path $OP_{rp2}$ from the mount-side reflective mirror 220 of the mirror mount assembly 200 located at the last sequence. In addition, the second reference processing optical path $OP_{rp2}$ refers to the processing optical path $OP_p$ through which the laser beam LB travels when the laser beam LB is transmitted from the mount-side reflective mirror 220 of the mirror mount assembly 200 located at the last sequence travels without optical path distortion. As described above, a second correlation is formed between the nozzle-side sensing optical path $OP_{s2}$ and the processing optical path $OP_p$. Accordingly, the second reference sensing optical path $OP_{rs2}$ may also be set so that a second correlation is formed between the second reference sensing optical path $OP_{rs2}$ and the second reference processing optical path $OP_{rp2}$. Then, the location coordinate of the nozzle-side reference beam spot $BS_{r2}$ may function as a nozzle-side reference point for examining whether distortion of the optical path of the laser beam LB occurs using the location coordinate of the nozzle-side test beam spot $BS_{m2}$.

As shown in FIG. 12, when the instruction light $LB_m$ is transmitted along the processing optical path $OP_p$ coinciding with the second reference processing optical path $OP_{rp2}$, the nozzle-side sensing optical path $OP_{s2}$ coincides with the second reference sensing optical path $OP_{rs2}$. In addition, as shown in FIG. 13, when the instruction light $LB_m$ is transmitted to the nozzle-side reflective mirror 320 along the processing optical path $OP_p$ that is deviated from the second reference processing optical path $OP_{rp2}$ by a predetermined optical path difference $D_4$, the nozzle-side sensing optical path $OP_{s2}$ and the second reference sensing optical path $OP_{rs2}$ do not coincide with each other by the optical path difference $D_3$ proportional to the optical path difference $D_4$ between the processing optical path $OP_p$ and the second reference processing optical path $OP_{rp2}$.

The examination module 50 may derive the vector of the processing optical path $OP_p$ by analyzing the vector of the nozzle-side sensing optical path $OP_{s2}$ using a second correlation. As described above, the derived vector of the processing optical path $OP_p$ may include the location coordinate, extension direction, and various data of the processing optical path $OP_p$. Accordingly, the examination module 50 may calculate the optical path difference $D_4$ between the processing optical path $OP_p$ and the second reference processing optical path $OP_{rp2}$ based on the optical path difference $D_3$ between the nozzle-side sensing optical path $OP_{s2}$ and the second reference sensing optical path $OP_{rs2}$. The optical path difference $D_4$ calculated in this way may correspond to a vector value indicating the absolute value and direction of optical path distortion occurring in the process of transmitting the laser beam LB along the processing optical path $OP_p$ to the laser nozzle assembly 30.

Based on the vector of the processing optical path $OP_p$ derived using the nozzle-side sensor 350, the optical path difference $D_4$, and the like, the examination module 50 may determine whether the instruction light $LB_m$ is transmitted along the second reference processing optical path $OP_{rp2}$ to the nozzle-side reflective mirror 320. However, the processing light $LB_p$ is transmitted along the processing optical path $OP_p$ in the same manner as the instruction light $LB_m$, and then the processing target P is irradiated with the processing light $LB_p$. Accordingly, upon determining that the instruction light $LB_m$ is transmitted along the second reference processing optical path $OP_{rp2}$ to the nozzle-side reflective mirror 320, the examination module 50 may determine that a predetermined reference processing point of the processing target P is irradiated with the processing light $LB_p$ without error. On the other hand, upon determining that the instruction light $LB_m$ is transmitted to the nozzle-side reflective mirror 320 along the processing optical path $OP_p$ that does not coincide with the second reference processing optical path $OP_{rp2}$ by the predetermined optical path difference $D_4$, the examination module 50 may determine that a distortion point spaced apart from a predetermined reference processing point of the processing target P by the predetermined optical path difference $D_4$ is irradiated with the processing light $LB_p$.

As described above, the laser beam LB oscillated from the laser oscillator 10 is sequentially reflected by the mount-side reflective mirrors 220 of the mirror mount assemblies 200 and is transmitted to the nozzle-side reflective mirror 320 along the processing optical path $OP_p$. Accordingly, when the processing optical path $OP_p$ and the second reference processing optical path $OP_{rp2}$ do not coincide with each other, the examination module 50 may determine that distortion of the processing optical path $OP_p$ occurs due to an abnormal phenomenon in the process of transmitting the laser beam LB to the laser nozzle assembly 300. The abnormal phenomenon is a phenomenon in which alignment of the mount-side reflective mirror 220 of the mirror mount assembly 200 located at the last sequence is defective or distortion of the processing optical path $OP_p$ occurs in the process of transmitting the laser beam LB to the laser nozzle assembly 300.

In addition, when the optical path difference $D_4$ between the processing optical path $OP_p$ and the second reference processing optical path $OP_{rp2}$ exceeds a predetermined reference optical path difference, the examination module 50 preferably determines that the processing optical path $OP_p$ and the second reference processing optical path $OP_{rp2}$ do not coincide with each other. Physically completely eliminating distortion of the processing optical path $OP_p$ is difficult due to tolerances in the manufacturing process and errors in the assembly process. Accordingly, only when the optical path difference $D_4$ between the processing optical path $OP_p$ and the second reference processing optical path $OP_{rp2}$ is large enough to adversely affect the processing quality of the processing target P due to distortion of the processing optical path $OP_p$, it is determined that the processing optical path $OP_p$ and the second reference processing optical path $OP_{rp2}$ do not coincide with each other.

FIG. 14 is a drawing for explaining a method of examining whether optical path distortion occurs in a laser apparatus, and FIGS. 15 to 22 are drawings for explaining a first method of correcting optical path distortion using an aligner.

When the laser apparatus 1 is used for a long time, alignment of the mount-side reflective mirror 220 is arbitrarily changed from design values due to wear, aging, and assembly tolerances of the mount-side reflective mirror 220, the driving motor 234, and other components, vibration applied from the outside, other external forces, and the like, leading to distortion of the optical path of the laser beam LB. When distortion of the optical path of the laser beam LB occurs, the quality of the processing target P may be deteriorated. To solve this problem, operation of examining whether optical path distortion occurs in the laser apparatus 1 and operation of correcting optical path distortion occurring in the laser apparatus 1 may be performed.

Preferably, operation of examining whether optical path distortion occurs in the laser apparatus 1 is performed whenever predetermined examination conditions are satisfied. Examination conditions are not particularly limited. For example, when a predetermined reference time has elapsed since optical path distortion was previously examined, when laser processing operation of the processing target P is finished, or when the laser apparatus 1 starts up (power ON), whether optical path distortion occurs may be examined.

Methods of examining whether optical path distortion occurs in the laser apparatus 1 are not particularly limited. For example, operation of examining whether optical path distortion occurs in the laser apparatus 1 may be performed by driving the laser oscillator 10 using the controller 40 to oscillate the instruction light $LB_m$ and driving the total mount-side transport members 240 and the nozzle-side transport member 330 so that the nozzle-side sensing surface 350a of the nozzle-side sensor 350, which is a final sensor, is irradiated with the instruction light $LB_m$ in a state in which the total mount-side reflective mirrors 220 and the nozzle-side reflective mirror 320 included in the laser apparatus 1 are respectively inserted into the processing optical path $OP_p$. Then, as shown in FIG. 14, based on the distance between the nozzle-side test beam spot $BS_{m2}$ and the nozzle-side reference beam spot $BS_{r2}$ on the nozzle-side sensing surface 350a, which is measured by analyzing a nozzle-side optical path signal output from the nozzle-side sensor 350, the examination module 50 may examine whether optical path distortion occurs.

For example, when the distance between the nozzle-side test beam spot $BS_{m2}$ and the nozzle-side reference beam spot $BS_{r2}$ exceeds a predetermined reference interval, the examination module 50 may determine that the optical path of the laser beam LB, i.e., the processing optical path $OP_p$, is distorted by the optical path difference $D_4$ proportional to the optical path difference $D_3$ between the nozzle-side sensing optical path $OP_{s2}$ and the second reference sensing optical path $OP_{rs2}$ in a process of transmitting the laser beam LB to the laser nozzle assembly 30.

For example, when the distance between the nozzle-side test beam spot $BS_{m2}$ and the nozzle-side reference beam spot $BS_{r2}$ is less than or equal to a predetermined reference interval, the examination module 50 may determine that distortion of the optical path of the laser beam LB does not occur in a process of transmitting the laser beam LB to the laser nozzle assembly 30.

However, based on the examination result that optical path distortion occurs in a process of transmitting the laser beam LB to the laser nozzle assembly 30, it may be determined that distortion of the optical path of the laser beam LB occurs at at least one mirror mount assembly 200, but the mirror mount assembly 200 in which optical path distortion occurs may not be specified. Accordingly, upon determining that optical path distortion occurs in a process of transmitting the laser beam LB to the laser nozzle assembly 30, operation of examining whether optical path distortion occurs in the mirror mount assemblies 200 and operation of correcting optical path distortion occurring in the mirror mount assemblies 200 are preferably performed individually for each of the mirror mount assemblies 200.

Optical path distortion occurring in any one of the mirror mount assemblies 200 has a pattern that increases toward a later sequence of the reference transmission sequences S. Accordingly, operation of examining whether optical path distortion occurs in the mirror mount assembly 200 located at a specific sequence before the last sequence of the reference transmission sequences S is preferably performed using the mount-side sensor 260 included in the mirror mount assembly 200 located immediately after the specific sequence. In addition, operation of examining whether optical path distortion occurs in the mirror mount assembly 200 located at the last sequence of the reference transmission sequences S is preferably performed using the nozzle-side sensor 350 included in the laser nozzle assembly 30.

The aligner 230 may adjust the optical path of the laser beam LB by changing alignment of the mount-side reflective mirror 220 interlocked with the aligner 230 to adjust the reflection angle of the mount-side reflective mirror 220. Accordingly, operation of correcting distortion of the optical path of the mirror mount assembly 200 determined as having optical path distortion is preferably performed by adjusting the optical path of the laser beam LB using the aligner 230 included in the mirror mount assembly 200 according to the pattern of occurrence of optical path distortion.

In addition, the aligner 230 includes the dial 232 for adjusting alignment of the mount-side reflective mirror 220 according to rotation directions and rotation angles and the driving motor 234 for driving rotation of the dial 232. Accordingly, the direction of the optical path of the laser beam LB adjusted by the dial 232 is determined according to the rotation direction of the driving motor 234, and the degree of displacement of the optical path of the laser beam LB adjusted by the dial 232 is determined according to the rotation angle of the driving motor 234. Accordingly, operation of correcting distortion of the optical path of the mirror mount assembly 200 determined as having optical path distortion may be performed by selectively driving the driving motor 234 included in the mirror mount assembly 200 determined as having optical path distortion according to the pattern of occurrence of optical path distortion.

Preferably, operation of correcting distortion of the optical path of the mirror mount assembly 200 determined as having optical path distortion is performed through a method of controlling the speed of the driving motor 234. In general, the speed control method refers to a motor control method in which an analog speed command voltage is applied to a motor and the motor is driven to continuously follow a speed command corresponding to the speed command voltage. However, the present disclosure is not limited thereto, and even in the case of a motor having a pulse input, the speed control method may be implemented by controlling the motor by changing speed setting regardless of locations.

Hereinafter, a method of examining optical path distortion for each of the mirror mount assemblies 200 and a method of correcting optical path distortion will be described with reference to the drawings.

Optical path distortion occurring in any one of the mirror mount assemblies 200 has a pattern that increases toward a later sequence of the reference transmission sequences S. Thus, operation of examining optical path distortion and operation of correcting optical path distortion for each of the mirror mount assemblies 200 are preferably performed individually for each of the mirror mount assemblies 200 according to the reference transmission sequences S. Accordingly, hereinafter, a method of individually performing operation of examining optical path distortion and operation of correcting optical path distortion for each of the mirror mount assemblies 200 according to the reference transmission sequences S will be described.

First, operation of examining whether optical path distortion occurs in the mirror mount assembly 200 located at the first sequence of the reference transmission sequences S and operation of correcting optical path distortion occurring in the mirror mount assembly 200 located at the first sequence will be described.

Operation of examining whether optical path distortion occurs in the mirror mount assembly 200 located at the first sequence and operation of correcting optical path distortion occurring in the mirror mount assembly 200 located at the first sequence are performed by driving the laser oscillator 10 using the controller 40 to oscillate the instruction light $LB_m$ and inserting the mount-side reflective mirror 220 included in the mirror mount assembly 200 located at the first sequence into the processing optical path $OP_p$ in a state in which the mount-side reflective mirror 220 included in the mirror mount assembly 200 located at the second sequence of the reference transmission sequences S is drawn out of the processing optical path $OP_p$. Then, as shown in FIG. 15, the instruction light $LB_m$ oscillated from the laser oscillator 10 is guided from the mirror mount assembly 200 located at the second sequence to the mount-side sensing optical path $OP_{s1}$ so that the mount-side sensing surface 260a of the mount-side sensor 260 included in the mirror mount assembly 200 located at the second sequence is irradiated with the instruction light $LB_m$.

As shown in FIG. 15, based on the distance between the mount-side test beam spot $BS_{m1}$ and the mount-side reference beam spot $BS_{r1}$ on the mount-side sensing surface 260a, which is measured by analyzing a mount-side optical path signal output the mount-side sensor 260 of the mirror mount assembly 200 located at the second sequence, the examination module 50 may determine that optical path distortion occurs in the mirror mount assembly 200 located at the first sequence.

For example, when the distance between the mount-side test beam spot $BS_{m1}$ and the mount-side reference beam spot $BS_{r1}$ exceeds a predetermined reference interval, the examination module 50 may determine that the optical path of the laser beam LB, i.e., the processing optical path $OP_p$, is distorted by the optical path difference $D_2$ proportional to the optical path difference $D_1$ between the mount-side sensing optical path $OP_{s1}$ and the first reference sensing optical path $OP_{rs1}$ at the mount-side reflective mirror 220 included in the mirror mount assembly 200 located at the first sequence.

For example, when the distance between the mount-side test beam spot $BS_{m1}$ and the mount-side reference beam spot $BS_{r1}$ is less than or equal to a predetermined reference interval, the examination module 50 may determine that distortion of the optical path of the laser beam LB does not occur at the mount-side reflective mirror 220 included in the mirror mount assembly 200 located at the first sequence.

Upon determining that optical path distortion occurs in the mount-side reflective mirror 220 included in the mirror mount assembly 200 located at the first sequence, operation of correcting optical path distortion occurring in the mirror mount assembly 200 located at the first sequence may be performed using a method of controlling the speed of the driving motor 234 included in the mirror mount assembly 200 located at the first sequence.

As described above, the mount-side sensing surface 260a is configured as a 2D plane in which an XY coordinate system is set so that the location coordinate of the mount-side test beam spot $BS_{m1}$ is specified. Accordingly, operation of correcting optical path distortion occurring in the mirror mount assembly 200 located at the first sequence may be performed using a method of controlling the speed of the driving motor 234 of the mirror mount assembly 200 located at the first sequence so that the mount-side test beam spot $BS_{m1}$ is moved to a location where the distance between the mount-side test beam spot $BS_{m1}$ and the mount-side reference beam spot $BS_{r1}$ is less than or equal to a predetermined reference interval on the mount-side sensing surface 260a of the mirror mount assembly 200 located at the second sequence.

In addition, the mirror mount assemblies 200 each include the first aligner 230a for moving the optical path of the laser beam LB in the X-direction and the second aligner 230b for moving the optical path of the laser beam LB in the Y-direction. Accordingly, operation of correcting optical path distortion occurring in the mirror mount assembly 200 located at the first sequence may include operation of correcting optical path distortion in the X-direction by driving the first driving motor 234a of the first aligner 230a in a speed control manner; operation of correcting optical path distortion in the Y-direction by driving the second driving motor 234b of the second aligner 230b in a speed control manner; and the like. For convenience of explanation, hereinafter, optical path distortion in the X-direction is referred to as X-direction optical path distortion, and optical path distortion in the Y-direction is referred to as Y-direction optical path distortion.

Hereinafter, to explain a method of performing operation of correcting X-direction optical path distortion and operation of correcting Y-direction optical path distortion, operation of correcting X-direction optical path distortion by driving the first driving motor 234a of the first aligner 230a in a speed control manner is exemplarily described.

The controller 40 corrects X-direction optical path distortion occurring at the mount-side reflective mirror 200 of the mirror mount assembly 200 located at the first sequence by driving the first driving motor 234a included in the mirror mount assembly 200 located at the first sequence at a target driving speed $V_{11}$ for a target driving time $T_{11}$ so that the mount-side test beam spot $BS_{m1}$ is moved to a location where the distance between the mount-side test beam spot $BS_{m1}$ and the mount-side reference beam spot $BS_{r1}$ is less than or equal to a predetermined reference interval on the mount-side sensing surface 260a of the mirror mount assembly 200 located at the second sequence.

For this purpose, according to the pattern of occurrence of optical path distortion, the laser apparatus 1 may further include a calculation module 60 for calculating the target driving speed $V_{11}$ and the target driving time $T_{11}$ of the driving motor 234.

The calculation module 60 may calculate the target driving speed $V_{11}$ of the first driving motor 234a included in the mirror mount assembly 200 located at the first sequence according to a pattern in which X-direction optical path distortion occurs at the mount-side reflective mirror 220 included in the mirror mount assembly 200 located at the first sequence. Here, the target driving speed $V_{11}$ of the first driving motor 234a refers to a vector value including the rotation speed and rotation direction of the first driving motor 234a.

The calculation module 60 may calculate the target driving speed $V_{11}$ of the first driving motor 234a to correct X-direction optical path distortion by moving the mount-side reference beam spot $BS_{r1}$ in a direction opposite to a direction in which X-direction optical path distortion occurs. In particular, the calculation module 60 may calculate the target driving speed $V_{11}$ of the first driving motor 234a by analyzing data about an X-direction optical path distortion vector, the driving properties (torque, responsiveness, etc.) of the first driving motor 234a, the sensing area of the mount-side sensing surface 260a, the driving conditions of the first driving motor 234a, and the like.

The X-direction optical path distortion vector refers to a vector value including the absolute value $E_{x1}$ and the occurrence direction of X-direction optical path distortion. The absolute value $E_{x1}$ of X-direction optical path distortion represents a distance by which the mount-side test beam spot $BS_{m1}$ is spaced apart from the mount-side reference beam spot $BS_{r1}$ in the X-direction, and the occurrence direction of X-direction optical path distortion indicates whether the mount-side test beam spot $BS_{m1}$ is spaced apart from the mount-side reference beam spot $BS_{r1}$ in either the "+X direction" or the "−X direction".

Equation 1 below is an equation for calculating a target driving speed $V_{sn}$ of the driving motor 234.

$$V_{sn} = \frac{E_{dn}}{E_{dmax}} * V_{smax} * \alpha_x \quad \text{[Equation 1]}$$

s: Type of motor
Example) 1: First driving motor, 2: Second driving motor
n: Optical path distortion correction order
Example) 1: 1st optical path distortion correction
d: The occurrence direction of optical path distortion
Example) x: X direction, y: Y direction
$V_{sn}$: The target driving speed of an s-type driving motor when performing n-th optical path distortion correction using the s-type driving motor
Example) $V_{11}$: The target driving speed of a first driving motor when performing 1st optical path distortion correction operation using the first driving motor
$E_{dn}$: The absolute value of d-direction optical path distortion when performing an n-th correction operation for d-direction optical path distortion
Example) $E_{x1}$: The absolute value of X-direction optical path distortion when performing 1st correction operation for X-direction optical path distortion
$E_{dmax}$: The absolute value of maximum optical path distortion for d-direction
Example) $E_{xmax}$: The absolute value of maximum X-direction optical path distortion
$V_{smax}$: The maximum target driving speed of an s-type driving motor when performing operation of correcting optical path distortion using the s-type driving motor
Example) $V_{1max}$: The maximum target driving speed of a first driving motor when performing operation of correcting optical path distortion using the first driving motor
$\alpha_s$: The speed factor of an s-type driving motor when performing operation of correcting optical path distortion using the s-type driving motor
Example) $\alpha_1$: The speed factor of a first driving motor when performing operation of correcting optical path distortion using the first driving motor As described later, operation of correcting optical path distortion may be repeatedly performed over n-th order according to the driving conditions of the driving motor 234. Accordingly, Equation 1 is provided to calculate the target driving speed $V_{sn}$ of the driving motor 234 for each correction order. According to Equation 1, the target driving speed $V_{11}$ of the first driving motor 234a corresponds to the 1st target driving speed of the first driving motor 234a when performing 1st correction operation for X-axis optical path distortion.

The absolute value ($E_{dmax}$) of maximum optical path distortion is determined depending on the sensing area of sensing surfaces 260a and 350a. For example, as shown in FIG. 16, when the X-axis direction sensing length of the sensing surfaces 260a and 350a is X, the absolute value ($E_{xmax}$) of maximum X-direction optical path distortion is X/2 with respect to the locations of reference beam spots $BS_{r1}$ and $BS_{r2}$. When the Y-axis direction sensing length of the sensing surfaces 260a and 350a is Y, the absolute value ($E_{ymax}$) of maximum Y-direction optical path distortion is Y/2 with respect to the locations of the reference beam spots $BS_{r1}$ and $BS_{r2}$.

Maximum target driving speed ($V_{smax}$) is the target driving speed of the driving motor 234 when optical path distortion corresponding to maximum optical path distortion occurs. The maximum the target driving speed $V_{11}$ may be determined depending on the sensing area of the sensing surfaces 260a and 350a, speed curve, torque, the other properties of the driving motor 234, and the like.

Speed factor ($\alpha_s$) is a coefficient provided to minimize the number of times operation of correcting optical path distortion is performed. The speed factor ($\alpha_s$) may be individually determined for each of the driving motors 234 by big data analysis on effect of the properties of the driving motor 234 on operation of correcting optical path distortion.

The laser apparatus may further include a database 70 for storing various data for correcting optical path distortion by controlling the sensing area of the sensing surfaces 260a and 350a, the absolute value ($E_{dmax}$) of maximum optical path distortion, the properties of each of driving motors 234, the maximum target driving speed ($V_{smax}$) of each of driving motors 234, and the speed factor ($\alpha_s$) of each of the driving motors 234 in a speed control manner.

The calculation module 60 may calculate the target driving speed $V_{11}$ of the first driving motor 234a, and then may calculate the target driving time $T_{11}$ of the first driving motor 234a as shown in Equation 2 below. According to Equation 2, the target driving time $T_{11}$ of the first driving motor 234a corresponds to the 1st target driving time of the first driving motor 234a when performing 1st correction operation for X-axis optical path distortion.

$$T_{sn} = \frac{E_{dn}}{V_{sn}} \quad \text{[Equation 2]}$$

$T_{sn}$: The target driving time of an s-type driving motor when performing n-th optical path distortion correction using the s-type driving motor
Example) $T_{11}$: The target driving time of a first driving motor when performing 1st optical path distortion correction operation using the first driving motor The controller 40 drives the first driving motor 234a at the target driving speed $V_{11}$ for the target driving time $T_{11}$. Then, as shown in FIG. 16, the mount-side test beam spot $BS_{m1}$ is moved at a speed corresponding to the target driving speed $V_{11}$ for the target driving time T in a direction opposite to a direction in which X-direction optical path distortion occurs, so that X-direction optical path distortion is corrected.

For example, when an X-direction optical path distortion vector is −X/2, the calculation module 60 may calculate the target driving speed $V_{11}$ and the target driving time $T_{11}$ of the first driving motor 234a, and the controller 40 may correct X-direction optical path distortion by driving the first driving motor 234a at the target driving speed $V_{11}$ for the target driving time $T_{11}$.

However, due to the characteristics of general motors, depending on inertia acting upon driving a motor and the wear condition and other driving conditions of the motor, a predetermined error may occur between the target rotational aspect of the motor according to the design value of the motor and the actual rotational aspect according to the driving condition of the motor. Accordingly, when a command signal corresponding to the target driving speed $V_{11}$ and the target driving time $T_{11}$ is transmitted to the first driving motor 234a, the actual driving speed and the actual driving time of the first driving motor 234a may different from the target driving speed V and the target driving time $T_{11}$ of the first driving motor 234a.

Accordingly, when the first driving motor 234a is driven in a speed control manner so that the first driving motor 234a is driven at the target driving speed $V_{11}$ for the target driving time $T_1$, the mount-side test beam spot $BS_{m1}$ may stop after passing the zero point of the X-axis by a predetermined distance or may stop within a predetermined distance from the zero point of the X-axis. That is, when 1st operation of correcting X-direction optical path distortion is performed, predetermined 2nd X-direction optical path distortion may occur again due to the driving conditions of the first driving motor 234a. Here, the zero point of the X-axis refers to the X-axis coordinate of the mount-side reference beam spot $BS_{r1}$.

Considering that 2nd X-direction optical path distortion may occur, the calculation module 60 preferably calculates the target driving speed $V_{11}$ and the target driving time $T_{11}$ of the first driving motor 234a according to the properties of the first driving motor 234a so that the absolute value $E_{x2}$ of 2nd X-direction optical path distortion is minimized.

In addition, the calculation module 60 may analyze a 2nd X-direction optical path distortion vector and the driving properties (torque, responsiveness) of the first driving motor 234a, and may use the analyzed results as learning data for calculating the target driving speed $V_{11}$ and the target driving time $T_{11}$ of the first driving motor 234a when X-direction optical path distortion similar to initial X-direction optical path distortion occurs. The learning data is preferably stored in the database 70.

After performing 1st operation of correcting X-direction optical path distortion, the calculation module 60 calculates a 2nd target driving speed $V_{12}$ of the first driving motor 234a so that 2nd operation of correcting X-direction optical path distortion is performed. For example, the calculation module 60 may calculate the 2nd target driving speed $V_{12}$ of the first driving motor 234a using Equation 1 to move the mount-side reference beam spot $BS_{r1}$ in a direction opposite to a direction in which 2nd X-direction optical path distortion occurs so that 2nd X-direction optical path distortion is corrected.

However, 2nd X-direction optical path distortion corresponds to a small error caused by the driving conditions of the first driving motor 234a upon correcting the initial X-direction optical path distortion, and thus the absolute value $E_{x2}$ of 2nd X-direction optical path distortion is smaller than the absolute value $E_{x1}$ of the initial X-direction optical path distortion. Accordingly, according to Equation 1, the 2nd target driving speed $V_{12}$ of the first driving motor 234a is calculated to have an absolute value smaller than the absolute value of the 1st target driving speed $V_{11}$ of the first driving motor 234a.

In addition, as described above, the calculation module 60 may calculate the 2nd target driving speed $V_{12}$, and then may calculate a 2nd target driving time $T_{12}$ of the first driving motor 234a using Equation 2.

The controller 40 drives the first driving motor 234a at the 2nd target driving speed $V_{12}$ for the 2nd target driving time $T_{12}$. Then, as shown in FIG. 17, the mount-side test beam spot $BS_{m1}$ is moved at a speed corresponding to the 2nd target driving speed $V_{12}$ for the 2nd target driving time $T_{12}$ in a direction opposite to a direction in which 2nd X-direction optical path distortion occurs, so that 2nd correction of X-direction optical path distortion is performed.

For example, when a 2nd X-direction optical path distortion vector is +X/10, the calculation module 60 may calculate the 2nd target driving speed $V_{12}$ and the 2nd target driving time $T_{12}$ so that the mount-side test beam spot $BS_{m1}$ is moved in the "–X direction" by X/10, and the controller 40 may correct 2nd X-direction optical path distortion by driving the first driving motor 234a at the 2nd target driving speed $V_{12}$ for the 2nd target driving time $T_{12}$.

However, even when performing correction of 2nd X-direction optical path distortion, according to the driving conditions of the first driving motor 234a, the 2nd actual driving speed and 2nd actual driving time of the first driving motor 234a may be different from the 2nd target driving speed $V_{12}$ and the 2nd target driving time $T_{12}$ of the first driving motor 234a. That is, even when performing 2nd X-direction optical path distortion correction, according to the driving conditions of the first driving motor 234a, predetermined 3rd X-direction optical path distortion may occur again. In the case of the 3rd X-direction optical path distortion, the mount-side test beam spot $BS_{m1}$ may also stop after passing the zero point of the X-axis by a predetermined distance or may stop within a predetermined distance from the zero point of the X-axis.

Referring to FIG. 18, when performing correction of X-direction optical path distortion, 3rd X-direction optical path distortion corresponds to a small error caused by the driving conditions of the first driving motor 234a, and thus an absolute value $E_{x3}$ of 3rd X-direction optical path distortion is smaller than the absolute value $E_{x2}$ of 2nd X-direction optical path distortion. Accordingly, as a result of performing operation of correcting 2nd X-direction optical path distortion, the location of the mount-side test beam spot $BS_{m1}$ converges to the zero point of the X-axis compared to the case in which 1st X-direction optical path distortion correction operation is performed.

Considering that 3rd X-direction optical path distortion may occur, the calculation module 60 preferably calculates the 2nd target driving speed $V_{12}$ and the 2nd target driving time $T_{12}$ of the first driving motor 234a according to the properties of the first driving motor 234a so that the absolute value $E_{x3}$ of 3rd X-direction optical path distortion is minimized.

In addition, the calculation module 60 may analyze a 3rd X-direction optical path distortion vector and the driving properties (torque, responsiveness) of the first driving motor 234a, and may use the analyzed results as learning data for calculating the target driving speed $V_{11}$ and the target driving time $T_{11}$ of the first driving motor 234a when X-direction optical path distortion similar to 2nd X-direction optical path distortion occurs. The learning data is preferably stored in the database 70.

As described above, when operation of driving the first driving motor 234a at an n-th target driving speed $V_{1n}$ for an n-th target driving time $T_{1n}$ according to a speed control method is repeatedly performed n times, the location of the mount-side test beam spot $BS_{m1}$ gradually converges to the zero point of the X-axis, and thus X-axis optical path distortion may be corrected.

As shown in FIG. 19, when the distance between the mount-side test beam spot $BS_{m1}$ and the zero point of the X-axis decreases to be less than or equal to a predetermined reference interval by an n-th operation of correcting X-direction optical path distortion, it is determined that correction of X-direction optical path distortion is completed, and then operation of correcting X-direction optical path distortion may be stopped.

After performing operation of correcting X-direction optical path distortion as described above, as shown in FIGS. 20 and 21, operation of driving the second driving motor 234b at an n-th target driving speed $V_{2a}$ for an n-th target driving time $T_{2a}$ according to a speed control method is repeatedly performed n times so that the location of the mount-side test beam spot $BS_{m1}$ gradually converges to the zero point of the Y-axis. Thereby, Y-direction optical path distortion may be corrected. Here, the zero point of the Y-axis refers to the coordinate of the Y-axis of the mount-side reference beam spot $BS_{r1}$.

In FIGS. 20 and 21, drawing symbol '$E_{y1}$' denotes the absolute value of initial Y-direction optical path distortion, drawing symbol '$E_{y2}$' denotes the absolute value of 2nd Y-direction optical path distortion, drawing symbol '$V_{21}$' denotes the 1st target driving speed of the second driving motor 234b, and drawing symbol '$V_{22}$' denotes the 2nd target driving speed of the second driving motor 234b.

As shown in FIG. 22, when the distance between the mount-side test beam spot $BS_{m1}$ and the zero point of the Y-axis decreases to be less than or equal to a predetermined reference interval by an n-th operation of correcting Y-direction optical path distortion, it is determined that correction of Y-direction optical path distortion is completed, and thus operation of correcting Y-direction optical path distortion may be stopped.

In addition, the case that optical path distortion occurring at the mount-side reflective mirror 220 of the mirror mount assembly 200 located at the first sequence is corrected by individually performing operation of correcting X-direction optical path distortion and operation of correcting Y-direction optical path distortion has been described, but the present disclosure is not limited thereto. That is, by performing operation of correcting X-direction optical path distortion and operation of correcting Y-direction optical path distortion at the same time by driving the first driving motor 234a and the second driving motor 234b at the same time, optical path distortion occurring at the mount-side reflective mirror 220 of the mirror mount assembly 200 located at the first sequence may be corrected.

After performing operation of examining whether optical path distortion occurs in the mirror mount assembly 200 located at the first sequence and operation of correcting optical path distortion occurring in the mirror mount assembly 200 located at the first sequence as described above, operation of examining whether optical path distortion occurs in the rest of the mirror mount assemblies 200 and operation of correcting optical path distortion occurring in the rest of the mirror mount assemblies 200 may be performed individually for each of the rest of the mirror mount assemblies 200 according to the reference transmission sequences S.

Referring to FIGS. 15 to 22, operation of examining whether optical path distortion occurs in each of the rest of the mirror mount assemblies 200 and operation of correcting optical path distortion occurring in each of the rest of the mirror mount assemblies 200 may be performed in the same manner as operation of examining whether optical path distortion occurs in the mirror mount assembly 200 located at the first sequence and operation of correcting optical path distortion occurring in the mirror mount assembly 200 located at the first sequence, and thus the detailed description thereof will be omitted.

As described above, by tracking the optical path of the laser beam LB using the sensors 260 and 350, the laser apparatus 1 may automatically examine whether distortion of the optical path of the laser beam LB occurs and may automatically specify a component in which distortion of the optical path of the laser beam LB occurs.

In addition, by performing driving using a method of controlling the speed of the driving motor 234 included in the aligner 230, the laser apparatus 1 performs operation of correcting optical path distortion multiple times to adjust the optical path of the laser beam LB so that the radiation position of the laser beam LB (the radiation positions of test beam spots $BS_{m1}$ and $BS_{m2}$ gradually converges to the zero point (the positions of the reference beam spots $BS_{r1}$ and $BS_{r2}$). Thereby, distortion of the optical path of the laser beam LB may be automatically corrected.

Through automatic examination and correction of distortion of the optical path of the laser beam LB, the laser apparatus 1 may improve the processing quality of the processing target P and may implement automation.

FIGS. 23 to 29 are drawings for explaining a second method of correcting optical path distortion using an aligner.

As described above, the aligner 230 may change alignment of the mirror plate 212 and the mount-side reflective mirror 220 mounted on the mirror plate 212 by changing the angle between the base block 211 and the mirror plate 212 around the fastening member 214. Accordingly, as shown in FIG. 23, according to the installation structure of the aligner 230 and the fastening member 214, when the first driving motor 234a included in the first aligner 230a is driven, the optical path of the laser beam LB may be adjusted in the X' direction forming a predetermined angle (θ) with the X direction on the sensing surfaces 260a and 350a. When the second driving motor 234b included in the second aligner 230b is driven, the optical path of the laser beam LB may be adjusted in the Y' direction forming a predetermined angle (θ) with the Y direction on the sensing surfaces 260a and 350a.

In this case, upon driving the first driving motor 234a, the test beam spots $BS_{m1}$ and $BS_{m2}$ mainly move in the X direction, and also move slightly in the Y direction. Correspondingly, upon driving the second driving motor 234b, the test beam spots $BS_{m1}$ and $BS_{m2}$ mainly move in the Y-direction, and also move slightly in the X-direction.

Accordingly, when operation of correcting optical path distortion for one direction of the X direction and the Y direction is first performed, and then operation of correcting optical path distortion for other directions is performed, optical path distortion for any one direction remains minute.

For example, as shown FIGS. 24 to 26, the first driving motor 234a performs an n-th correction operation of X-direction optical path distortion according to the above-described speed control method to converge the locations of the test beam spots $BS_{m1}$ and $BS_{m2}$ to the zero point of the X-axis. Then, as shown in FIGS. 27 to 29, the second driving motor 234b is driven according to the above-described speed control method to perform an n-th operation of correcting Y-direction optical path distortion so that the locations of the test beam spots $BS_{m1}$ and $BS_{m2}$ converge to the zero point of the Y-axis. As a result, X-direction optical path distortion remains minute.

When the absolute value (ΔE) of a residual optical path distortion vector is less than or equal to a predetermined reference interval, the laser processing quality of the processing target P is not adversely affected. However, when the absolute value (ΔE) of a residual optical path distortion vector exceeds a predetermined reference interval, the laser processing quality of the processing target P is adversely affected. To solve these problems, when the absolute value (ΔE) of a residual optical path distortion vector exceeds a predetermined reference interval, any one of operation of correcting X-axis optical path distortion and operation of correcting Y-axis optical path distortion is performed n times until the absolute value (ΔE) of a residual optical path distortion vector is less than or equal to a predetermined reference interval, and then the other operation may be performed n times. Thereby, deterioration of the laser processing quality of the processing target P due to slight optical path distortion caused by the installation structure of the aligner 230 and the fastening member 214 may be prevented.

FIG. 30 is a drawing for explaining a third method of correcting optical path distortion using an aligner.

According to the second method described above, to prevent deterioration of the laser processing quality of the processing target P due to slight optical path distortion caused by the installation structure of the aligner 230 and the fastening member 214, any one of operation of correcting X-axis optical path distortion and operation of correcting Y-axis optical path distortion is performed n times until the absolute value (ΔE) of a residual optical path distortion vector is less than or equal to a predetermined reference interval, and then the other operation is performed n times to correct optical path distortion. However, the present disclosure is not limited thereto.

For example, as shown in FIG. 30, to correct optical path distortion, operation of correcting X-axis optical path distortion and operation of correcting Y-axis optical path distortion may be performed alternately until the absolute value (ΔE) of a residual optical path distortion vector is less than or equal to a predetermined reference interval. In this case, the test beam spots $BS_{m1}$ and $BS_{m2}$ gradually approach the reference beam spots $BS_{r1}$ and $BS_{r2}$ while moving spirally around the reference beam spots $BS_{r1}$ and $BS_{r2}$.

The present disclosure relates to a laser apparatus. The laser apparatus can automatically examine whether distortion of the optical path of a laser beam occurs by tracking the optical path of the laser beam using various sensors and can automatically specify a component in which distortion of the optical path of the laser beam occurs.

In addition, according to the present disclosure, by driving a driving motor included in an aligner through a speed control method, the laser apparatus performs operation of correcting optical path distortion multiple times to adjust the optical path of a laser beam so that the radiation position of a laser beam (the radiation position of a test beam spot) gradually converges on the zero point. Thereby, distortion of the optical path of the laser beam can be automatically corrected.

Through automatic examination and correction of distortion of the optical path of a laser beam, the laser apparatus can improve the processing quality of a processing target and can implement automation.

Although the present disclosure has been described through limited examples and figures, the present disclosure is not intended to be limited to the examples. Those skilled in the art will appreciate that various modifications, additions, and substitutions are possible, without departing from the scope and spirit of the invention.

Therefore, the embodiments disclosed in the present disclosure are intended to describe the technical idea of the present disclosure, and the scope of the technical idea of the present disclosure is not limited by these embodiments. The scope of protection of the present disclosure should be defined by the following claims, and all technical ideas within the scope of protection should be construed as being included in the scope of the present disclosure.

DESCRIPTION OF SYMBOLS

1: LASER APPARATUS
10: LASER OSCILLATOR
20: OPTICAL SYSTEM
30: LASER NOZZLE ASSEMBLY
40: CONTROLLER
50: EXAMINATION MODULE
60: CALCULATION MODULE
70: DATABASE
200: MIRROR MOUNT ASSEMBLY
210: MIRROR MOUNT
211: BASE BLOCK
212: MIRROR PLATE
213: FIXING BLOCK
214: FASTENING MEMBER
215: SENSOR BLOCK
220: MOUNT-SIDE REFLECTIVE MIRROR
230: ALIGNER
232: DIAL
234: DRIVING MOTOR
240: MOUNT-SIDE TRANSPORT MEMBER
250: NOISE FILTER
260: MOUNT-SIDE SENSOR
310: LASER NOZZLE
312: CONDENSING LENS
320: NOZZLE-SIDE REFLECTIVE MIRROR
330: NOZZLE-SIDE TRANSPORT MEMBER
340: NOISE FILTER
350: NOZZLE-SIDE SENSOR
LB: LASER BEAM
P: PROCESSING TARGET
$LB_m$: INSTRUCTION LIGHT
$LB_p$: PROCESSING LIGHT
$OP_p$: PROCESSING OPTICAL PATH
$OP_{rp1}$: FIRST REFERENCE PROCESSING OPTICAL PATH
$OP_{rp2}$: SECOND REFERENCE PROCESSING OPTICAL PATH
$OP_{s1}$: MOUNT-SIDE SENSING OPTICAL PATH
$OP_{rs1}$: FIRST REFERENCE SENSING OPTICAL PATH
$OP_{s2}$: NOZZLE-SIDE SENSING OPTICAL PATH
$OP_{rs2}$: SECOND REFERENCE SENSING OPTICAL PATH
$BS_{m1}$: MOUNT-SIDE TEST BEAM SPOT
$BS_{m2}$: NOZZLE-SIDE TEST BEAM SPOT
$BS_{r1}$: MOUNT-SIDE REFERENCE BEAM SPOT
$BS_{r2}$: NOZZLE-SIDE REFERENCE BEAM SPOT
$D_1$, $D_2$, $D_3$, $D_4$: OPTICAL PATH DIFFERENCE

What is claimed is:

1. A laser apparatus, comprising:
a laser oscillator to oscillate a laser beam;
a mirror mount assembly comprising a mount-side reflective mirror to transmit the laser beam by reflecting the laser beam;
an aligner comprising:
a dial to change an alignment of the mount-side reflective mirror according to a rotation angle and a rotation direction and to adjust, by a degree of displacement of a reflection angle of the mount-side reflective mirror according to change in an alignment state, a processing optical path through which the laser beam travels; and a driving motor to drive a rotation of the dial;

an examination module to calculate an optical path difference between a predetermined reference processing optical path and the processing optical path and to examine whether an optical path distortion occurs on the processing optical path;

a calculation module, when the optical path difference exceeds a predetermined reference optical path difference, to calculate a target driving speed and a target driving time of the driving motor configured to change the alignment of the mount-side reflective mirror and to correct the optical path distortion so that the optical path difference is less than or equal to the predetermined reference optical path difference; and a controller to correct the optical path distortion by driving the driving motor according to the target driving speed and the target driving time, wherein a diagnosis of the optical path distortion by the examination module, a calculation of the target driving speed and the target driving time by the calculation module, and a correction of the optical path distortion by the controller are repeatedly performed until the optical path difference is less than or equal to the reference optical path difference, and wherein the target driving speed is determined by a following mathematical formula:

$$V_{sn} = \frac{E_{dn}}{E_{dmax}} * V_{smax} * a_s$$

whereby "s" represents an s-type of the driving motor,

"n" represents a correction order of the optical path distortion,

"d" represents an occurrence direction of the optical path distortion,

"$V_{sn}$" represents the target driving speed of the driving motor of the s-type when performing an n-th optical path distortion correction using the driving motor of the s-type, "$E_{dn}$" represents an absolute value of a d-direction optical path distortion when performing an n-th correction operation for the d-direction optical path distortion, "$E_{dmax}$" represents an absolute value of maximum optical path distortion for d-direction, "$V_{smax}$" represents a maximum target driving speed of the driving motor of the s-type when performing an operation of correcting the optical path distortion using the driving motor of the s-type, and "$a_s$" represents a speed factor of the driving motor of the s-type when performing operation of correcting the optical path distortion using the driving motor of the s-type.

2. The laser apparatus according to claim 1, wherein the calculation module calculates the target driving speed and the target driving time in consideration of driving properties of the driving motor that generates difference between an actual driving speed and actual driving time of the driving motor and the target driving speed and target driving time as the controller transmits command signals corresponding to the target driving speed and the target driving time to the driving motor.

3. The laser apparatus according to claim 2, further comprising a database to store, as learning data, the optical path difference reoccurring due to difference between the actual driving speed and actual driving time and the target driving speed and target driving time when the controller drives the driving motor to correct the optical path distortion, wherein the calculation module calculates the target driving speed and the target driving time based on the learning data.

4. The laser apparatus according to claim 1, further comprising a laser nozzle assembly comprising a laser nozzle to radiate the laser beam transmitted along the processing optical path from the mount-side reflective mirror to a processing target, and a nozzle-side sensing member to sense the laser beam transmitted to the laser nozzle and outputting a nozzle-side sensing signal comprising vector information of the processing optical path, wherein the examination module analyzes the nozzle-side sensing signal and calculates the optical path difference.

5. The laser apparatus according to claim 4, wherein the nozzle-side sensing member has a nozzle-side sensing surface provided to be irradiated with the laser beam, wherein a coordinate system to specify a location of a beam spot of the laser beam is set on the nozzle-side sensing surface, and the examination module calculates the optical path difference based on a location coordinate of a beam spot of the laser beam transmitted to the nozzle-side sensing surface.

6. The laser apparatus according to claim 5, wherein, when a distance between a predetermined nozzle-side reference point and the beam spot on the nozzle-side sensing surface exceeds a predetermined reference interval, the examination module determines that the optical path distortion has occurred, and the calculation module calculates the target driving speed and the target driving time to change alignment of the mount-side reflective mirror so that a distance between the predetermined nozzle-side reference point and the beam spot is corrected to be less than or equal to the predetermined reference interval.

7. The laser apparatus according to claim 1, wherein the mirror mount assembly is installed to be respectively located at any one of predetermined transmission sequences, the aligner is respectively installed to change alignment of the mirror mount assembly, the mirror mount assembly further comprises a mount-side sensing member to sense the laser beam and to output a mount-side sensing signal comprising vector information of the processing optical path, and the examination module analyzes the mount-side sensing signal and calculates the optical path difference.

8. The laser apparatus according to claim 7, wherein the mount-side sensing member has a mount-side sensing surface provided to be irradiated with the laser beam, wherein a coordinate system to specify a location of a beam spot of the laser beam is set on the mount-side sensing surface, and the examination module calculates the optical path difference based on a location coordinate of a beam spot of the laser beam transmitted to the mount-side sensing surface.

9. The laser apparatus according to claim 8, wherein, when a distance between a predetermined mount-side reference point and the beam spot on the mount-side sensing surface exceeds a predetermined reference interval, the examination module determines that the optical path distortion has occurred, and the calculation module calculates the target driving speed and the target driving time to change alignment of the mount-side reflective mirror so that a distance between the predetermined mount-side reference point and the beam spot is corrected to be less than or equal to the predetermined reference interval.

10. The laser apparatus according to claim 9, wherein the examination module examines whether the optical path distortion occurs at the mount-side reflective mirror of the mirror mount assembly located at any one sequence of transmission sequences by analyzing the mount-side sensing signal outputted from the mount-side sensing member of the mirror mount assembly located at a sequence following the any one sequence, and upon determining that the optical path distortion occurs at the mount-side reflective mirror of the mirror mount assembly located at the any one sequence, the calculation module calculates the target driving speed and the target driving time of the driving motor of an aligner capable of changing alignment of the mount-side reflective mirror of the mirror mount assembly located at the any one sequence among the aligner.

11. The laser apparatus according to claim 10, wherein the examination module examines whether optical path distortion occurs at the mount-side reflective mirror according to the transmission sequences.

\* \* \* \* \*